United States Patent
Kobayashi et al.

(10) Patent No.: US 7,344,288 B2
(45) Date of Patent: Mar. 18, 2008

(54) LIGHTING SYSTEM FOR VEHICLE

(75) Inventors: Shoji Kobayashi, Shizuoka (JP);
Toshihiro Shiimado, Aichi (JP);
Tomoaki Ikeyama, Aichi (JP)

(73) Assignees: Koito Manufacturing Co., Ltd.,
Minato-ku, Tokyo (JP); **Aisin AW Co.,
Ltd.**, Anjo, Aichi (JP)

( * ) Notice: Subject to any disclaimer, the term of this patent is extended or adjusted under 35 U.S.C. 154(b) by 285 days.

(21) Appl. No.: 11/119,441

(22) Filed: Apr. 29, 2005

(65) Prior Publication Data

US 2005/0253738 A1    Nov. 17, 2005

(30) Foreign Application Priority Data

Apr. 30, 2004  (JP) ................. P. 2004-135441
Apr. 30, 2004  (JP) ................. P. 2004-135442
Apr. 30, 2004  (JP) ................. P. 2004-135443

(51) Int. Cl.
*B60Q 1/08* (2006.01)
(52) U.S. Cl. ..................... 362/466; 362/465
(58) Field of Classification Search ......... 362/464–467
See application file for complete search history.

(56) References Cited

U.S. PATENT DOCUMENTS

| 6,459,387 B1 | 10/2002 | Kobayashi et al. |
| 6,853,906 B1 * | 2/2005 | Michi et al. ................ 701/207 |
| 2005/0004753 A1 * | 1/2005 | Weiland et al. ............. 701/208 |

FOREIGN PATENT DOCUMENTS

| JP | 2-296550 | 12/1990 |
| JP | 2002-52975 | 2/2002 |

* cited by examiner

*Primary Examiner*—Alan Cariaso
(74) *Attorney, Agent, or Firm*—Fish & Richardson P.C.

(57) ABSTRACT

A vehicle lighting system 1 reads position data of a plurality of nodes which are situated ahead of and behind the current position of a cruising vehicle using vehicle current position data and road map data to estimate the shape of a driving path by connecting the plurality of nodes via an interpolation process. Then, as to nodes which are recognized as change points of the shape of the driving path by a road node characteristic position detecting device 4, for example, a bending point or inflecting point, and a starting point and a terminating point of a curve path, a transition range is set ahead of and behind the nodes by a transition range setting device 5. Then, when the cruising vehicle runs through the range so set, a control quantity related to the illumination control of a vehicle headlamp 10 is made to be changed slowly.

12 Claims, 18 Drawing Sheets

Ni: NODE
Li: LINK

Ni, Ni+1, Ni+2: NODE
Li, Li+1: LINK

Ni, Ni+1, Ni+2, Ni+3: NODE
Li, Li+1, Li+2: LINK

Ni, Ni+1, Ni+2: NODE
Li, Li+1: LINK
$\alpha i$: BENDING ANGLE

Ni, Ni+1, Ni+2: NODE
Li, Li+1: LINK
K: TRANSITION RANGE

Ni, Ni+1, Ni+2, Ni+3: NODE
K: TRANSITION RANGE

Ni, Ni+1, Ni+2: NODE
Li, Li+1: LINK
K: TRANSITION RANGE

Ni, Ni+1, Ni+2, Ni+3: NODE
K: TRANSITION RANGE

■ HAIRPIN BEND

■ SLALOMING

LIGHTING SYSTEM FOR VEHICLE

This application claims foreign priorities based on Japanese Patent applications Nos. 2004-135441, 2004-135442, and 2004-135443, all filed on Apr. 30, 2004, the contents of which are incorporated herein by reference in its entirety.

BACKGROUND OF THE INVENTION

1. Field of the Invention

The present invention relates to a technique for implementing illumination control of lighting system for a vehicle while estimating the shape of a driving path ahead of the cruising vehicle.

2. Description of the Related Art

The following types of vehicle driving support systems are known with regard to the light distribution control of vehicle headlamps according to a driving path on which a cruising vehicle runs.

(I) A type in which an illumination control is performed while interlocking with a steering state of the vehicle; and (II) A type in which an automatic transmission control systems or traction control systems and vehicle stability control systems are employed, performing the relevant controls based on data on the shape of a road path obtained from vehicle navigation systems.

Firstly, in the type (I), a system is raised in which a steering angle is detected using, for example, a steering sensor, so that the illuminating direction of the headlamp is controlled so as match the traveling conditions of the vehicle and the system exhibits good controllability while driving on a curved path.

Secondly, in the type (II), namely, the lighting systems for the vehicles which enables the light distribution control of vehicle headlamps according to a driving path on which the cruising vehicle is traveling, there is known, for example, a type of lighting system in which the illumination range is controlled while determining a distance to a bend ahead of the cruising vehicle on the road on which it is driving or the direction of the bend based on the map information and information on the location of the cruising vehicle on the map, such as disclosed in JP-A-2-296550.

Alternatively, a system is known in which a beam control is performed using as a target position a position where the cruising vehicle is estimated to arrive after a predetermined period of time has elapsed from the current point in time, such as disclosed in JP-A-2002-52975.

In the lighting system like this, the following become critical in order to implement accurate illumination controls.

To obtain detailed information such as on the shape of a road path extending ahead of the vehicle; curved or bent, and the position of intersections and the like emerging ahead of the vehicle; and To obtain positional information on starting points and terminating points (or exit points) on curved and bent paths.

In addition, in configurations which make use of navigation systems, road-to-vehicle communication systems and the like, the shape of a road path can be estimated from position data of nodes (road notation points on a road map database) existing on the traveling path of the cruising vehicle through a 3-point arc interpolation process or the like.

However, the conventional systems have the following drawbacks.

In the type (I), for example, since a starting point of a curved or bent path can not be known in advance, in the event that there occurs a delay in performing an illumination control, there are caused problems that the field of vision in front of the driver is affected and that the driver is made to feel a feeling of physical disorder.

Further, in the type (II), when attempting to calculate shape data on the shape of a road path and starting points and terminating points of curved paths using geometric or shape engineering methods, with no sufficiently accurate map-matching, measurement of coordinates of the current position and road map database, it is difficult to obtain the shapes of curved and bent paths accurately. This causes a problem that sufficient accuracy cannot be ensured as to control timings of the illuminating direction. Namely, an illumination control that does not match the actual conditions is performed due to the lack of accuracy, causing a risk that the driver has to feel a feeling of physical disorder or uncomfortableness due to time lag in control timing, and this causes problems that not only driving is disturbed but also other road users are affected.

When driving on a curved or bent path, while it is preferable from the viewpoint of control to grasp a starting point and a terminating point of the curved or bent path, the processing and storage capacities of a CPU (central processing unit) that is used in the system needs to be increased. For example, when adopting an interpolation processing using spline curves and free curves, it becomes necessary to deal with an increase in calculation volume necessary for calculation and determination of the shape of a road path or a problem that the application of spline curves is made inappropriate depending on the number and arrangement of node points according to the shape of a road path (for example, in a road shape which is made up of winding paths and bent paths, in case the number of node points and the degree of an interpolation function are inappropriate, there are caused irregular amplitudes and an interpolation curve becomes wavy).

In a case where the driver's visual recognition is critical as with the light distribution control of headlamps, high accuracy is generally required, and in the event that the determination of the shape of a road path fails, there may be caused a risk that an illumination control that does not match actual conditions is performed.

For example, when controlling the light distribution of the headlamps based on the results of a calculation of the radius of the shape of the road path ahead of the vehicle through the 3-point arc interpolation, the following methods are raised.

(1) A method for estimating a position reached by the cruising vehicle in a predetermined period of time and controlling the direction of illumination beams using the position so estimated as a gazing point; and (2) A method for controlling the direction of illumination beams using a clipping point of a curved path as a gazing point.

For examples, FIGS. 23, 24 and 25 illustrates ways in which the vehicle runs, respectively, on a bent path, a curved path and at an intersection, in which N1 to N4 denote node points. In addition, in the drawings, symbols shown as something like a home plate in solid lines denote an actual current position "P" of the vehicle (a pointed portion of the symbol denotes a traveling direction of the vehicle), and symbols shown as something like a home plate in dotted lines denote the current position "Q" of the vehicle (a pointed portion of the symbol denotes a traveling direction of the vehicle) that is recognized on a navigation system. In each drawing, the positions P and Q are shown as not coinciding with each other.

In FIG. 23, a node N2 is a bending point, and the position Q is located slightly forward of the vicinity of a node N1. An arrow a followed by a dotted line indicates the traveling direction of the vehicle, and an arrow b followed by a dotted line indicates the illuminating direction of the headlamps. Then, the position P is located slightly forward of the vicinity of the node N2, and an arrow A followed by a solid line indicates the traveling direction of the vehicle, whereas an arrow B followed by a solid line indicates the illuminating direction of the headlamps. In addition, an arrow C followed by a solid line indicates an ideal illuminating direction of the headlamps at the position P.

A deviation between the actual vehicle position and the vehicle position on the map (an imaginary current position) emerges as a deviation between the illuminating directions, and in this example, an illuminating direction that is calculated at the position Q becomes the illuminating direction indicated by the arrow b followed by the dotted line and the illuminating direction becomes the direction indicated by the arrow B followed by the solid line at the actual position P. In case the positions P and Q had coincided with each other, the illuminating direction at the position P should have become the direction indicated by the arrow C followed by the solid line, however, since there is caused a deviation between both the positions in reality, there is caused a problem that the illuminating direction is controlled to be directed in a direction deviating from the ideal direction of the arrow C at the position P, that is, the direction indicated by the arrow B followed by the solid line.

Note that while in this example, a case is conceived in which the position Q is behind the position P as viewed in the traveling direction of the vehicle, a deviation from the ideal illuminating direction occurs even when the position Q is ahead of the position P.

In addition, in FIG. 24, a node N2 constitutes a starting point of a curved path, a position Q is slightly behind the node N2, which is located before an entry point to the curved path, and the orientations of arrows a and b which are followed by dotted lines, respectively, are in such a condition that they coincide with each other. Then, a position P is slightly behind the vicinity of a node N3, the orientations of arrows A and B which are followed by solid lines, respectively, coincide with each other, and there is occurring a large deviation between the orientations of the arrows A and B and an arrow C followed by a solid line when they are compared with each other (namely, the deviation from the arrow C followed by the solid line becomes larger as the curving radius of the curved path becomes smaller).

In FIG. 25, a position Q constitutes a point before an entry point into the intersection, and the orientations of arrows a and b which are followed by dotted lines, respectively, are in such a condition that they coincide with each other. Then, a position P constitutes a point after the entry into the intersection, and orientations of arrows A and B which are followed by solid lines, respectively, coincide with each other, there occurring a large deviation between the orientations of the arrows A and B, and an arrow C followed by a solid line which indicates an ideal orientation (a direction which the vehicle takes when it turns left) when they are compared with each other.

The deviations described above can be dealt with by improving the map-matching accuracy. Namely, the definition of shape characteristics is accurately implemented by analyzing the shape of the driving path in detail and orientation sensor information and information on the distance covered by the vehicle are obtained, so that segments covered by the vehicle may be collated with shapes of driving paths on the map one by one. In this case, however, there occurs a problem that the calculation and processing capacities of the system need to be increased largely or an unrealistically long processing period of time is required for a practical use.

Further, when applying the 3-point arc interpolation to these controls in the same way, for example, in the event that a phenomenon occurs in which the direction of illumination beams changes momentarily (quick drift of beams), it is concerned that the field of vision of the driver is affected or the driver of an oncoming vehicle is dazzled.

FIG. 26 shows an example of the shape of a road path resulting from connecting node points denoted by N1 to N4, and the resulting shape indicates a curved path of an S-shape.

The occurrence of the phenomenon is attributed to the fact that a difference is generated at all times between a radius R1 resulting from a calculation using nodes N1, N2, N3 situated at three points selected based on the current position of the vehicle as a reference and a radius R2 resulting from a calculation using nodes N2, N3, N4 which constitute next three points (in this example, the direction in which the road curves is reversed when the Node N2 is passed). It is found out that this phenomenon occurs when an estimated reached position of the cruising vehicle in a predetermined period of time or the clipping point is attempted to be illuminated and when the vehicle is driving on a bending path such as a hairpin bend and is passing a starting point and an exit point of a curved path. In addition, the phenomenon also occurs when the current vehicle position is erroneously recognized or there is caused a large position error due to an inferior map-matching.

In addition, in the type (II), for example, in a case where the shape of the road ahead of the current position of the cruising vehicle is recognized as a bent line using a road map database of the navigation system and an illumination control is performed according to the results of an estimation of the shape of the driving path, a map-matching accuracy and an estimation accuracy of road shapes are regarded as problems. Namely, in the event that the map-matching accuracy is as low as on the order of 10 m and the estimation accuracy of a bending direction of the driving path based on data of the map database is low, it becomes difficult to perform the light distribution control with high accuracy when driving on a curved path or slaloming path (a big problem still remains even if attempting to realize such a highly accurate light distribution control only by enhancing the map-matching and orientation measuring accuracies higher than the current levels).

Consequently, it is difficult to realize the highly accurate light distribution control without a proper illumination control which is performed according to a change in the traveling direction of the vehicle by estimating a shape change point of the driving path when the cruising vehicle is about to enter a curved path, a bent path and an intersection or assurance of high control accuracy.

Thus, it becomes critical to know how to implement a best illumination control of the headlamps within the limit of accuracy that has to be encountered.

SUMMARY OF THE INVENTION

To cope with this, an object of the invention is to provide a vehicle lighting system which can realize within the current position accuracy range an illumination control which does not make the driver feel a feeling of physical disorder when driving on curved or bent paths.

For solving the problems, another object of the invention is to provide a vehicle lighting system which can improve the visibility in front of the vehicle when it runs through a shape change point of a driving path as occurring on a curved or bent path and an intersection.

With a view to solving the problems, according to the invention, there is provided a vehicle lighting system which implements illumination control of vehicle headlamps while obtaining data on the current position of a vehicle and estimating the shape of a road on the periphery of the current position of the cruising vehicle using road map data, wherein position data of a plurality of nodes situated ahead of and behind the current position of the cruising vehicle are read using the data of the current position of the vehicle and the road map data, and the shape of a driving path is estimated by connecting the plurality of nodes through an interpolation process, so that a control quantity related to the illumination control of the vehicle headlamps is changed gradually as the cruising vehicle runs through a set range (hereinafter, referred to as an easement or transition range) which is regulated a head of and behind a node (hereinafter, referred to as a road node characteristic point) recognized as a point of change in the shape of the driving path.

Consequently, in the invention, the road node characteristic point which is recognized within the current position accuracy can be extracted, so that there occurs no drastic change in the illumination control quantity ahead of and behind the road node characteristic point so extracted.

According to the invention, the illumination control which makes the driver feel less a feeling of physical disorder can be realized without depending on the improvement in map-matching and orientation measuring accuracies. In addition, since no high-degree interpolation processing is required to estimate the shape of a road path, no significant increase in calculation volume and processing load is entrained.

Then, in the event that it is found as a result of estimation of the shape of the driving path that a curved or bent path exists ahead of the cruising vehicle, the transition range is made to be regulated in such a manner as to include the road node characteristic point, so that the illumination control quantity is changed gradually from a point in time when the cruising vehicle has entered the transition range until a point in time when the cruising vehicle has exited from the transition range, whereby the illumination control can be executed within the transition range without being affected by a map-matching error.

In addition, in the event that it is found as a result of estimation of the shape of the driving path that a curved or bent path exists ahead of the cruising vehicle, the road node characteristic point and links that are formed by connecting the road node characteristic point, respectively, to nodes situated a head of and behind the road node characteristic point in a traveling direction of the cruising vehicle are specified, and a driving path corresponding to the transition range is regulated by setting an arc which touches both the links, so that the control quantity is changed gradually according to a change in the shape of the driving path.

In determination or detection of the road node characteristic point, for example, of links that are formed by connecting nodes adjacent to each other, a link nearest to the current position of the cruising vehicle and a next link which is ahead of and adjacent to the link along the traveling direction of the vehicle are specified, and lengths of the respective links, a distance ratio between both the links and a bending angle between the links are calculated for comparison with reference values which are determined in advance, so that the characteristics of the node can be determined easily. Alternatively, in the case of a curved segment, a value of radius of curvature that is obtained by implementing an arc interpolation on three points which constitute two adjacent links and a tendency to increase or decrease of the value are obtained, so that the characteristics of the node can be determined.

Further, in this invention, there provided the following two control modes.

Primary control mode is a control mode in which the illumination control of a vehicle headlamp is performed while obtaining data on the current position of a vehicle and estimating the shape of a road on the periphery of the current position of the cruising vehicle.

Secondary control mode is a control mode in which the illumination control of the vehicle headlamp is performed based on the results of the estimation of the shape of the road on the periphery of the current position of the cruising vehicle and information detected on a steering state of the cruising vehicle Then, a driving distance or driving time that the cruising vehicle needs to cover or take from the current position thereof before the cruising vehicle reaches a shape change point of a driving path that is estimated to exist ahead in a traveling direction of the cruising vehicle or an intersection is calculated, so that the driving distance or driving time so calculated is compared with predetermined primary and secondary reference values. In the event that the distance or time that the cruising vehicle needs to cover or take is equal to or smaller than the primary reference value, the primary control mode is selected, whereas, in the event that the distance or time is equal to or smaller than the secondary reference value, which is smaller than the primary reference value, the secondary control mode is selected.

Consequently, in the invention, the illumination control of the vehicle headlamp can be performed in accordance with the primary control mode before the vehicle enters the shape change point on the driving path and the intersection, and the illuminating direction can be controlled in accordance with the secondary control mode by taking the steering conditions of the vehicle into consideration when the cruising vehicle approaches the shape change point on the driving path and the intersection.

According to the invention, the problems that cannot be solved only by one of the aforesaid types (I) and (II) can be overcome by changing the details of the illumination control according to the position of the cruising vehicle which approaches a curved path, a bent path or an intersection, whereby the forward visibility needed when driving on a curved path or the like can be improved to increase the driving safety.

Then, in the primary control mode, a distance and a direction from the current position of the cruising vehicle to the shape change point or the intersection are calculated, so that the illuminating direction or illuminating range of the vehicle headlamp is changed according to the distance and direction so calculated, whereby the illumination control can be performed in such a manner as to avoid any delay in controlling the illuminating direction or the like before the vehicle enters the curved or bent path.

In addition, in the secondary control mode, a primary control quantity with respect to the illuminating direction or illuminating range of the vehicle headlamp that is calculated based on information on the steering state of the cruising vehicle is compared with a secondary control quantity with respect to the illuminating direction or illuminating range of the vehicle headlamp that is calculated based on the results of the estimation of the shape of the driving path in the traveling direction of the cruising vehicle, and the larger one of the primary and secondary control quantities is selected, so that an illumination control is performed in accordance with the control quantity so selected. Namely, in case the larger one of the illuminating direction or illuminating range of the vehicle headlamp that is calculated based on the steering state of the cruising vehicle and the illuminating direction of illuminating range of the vehicle headlamp that is calculated based on the results of the estimation of the shape of the driving path is made to be selected, when a larger control is required with regard to the illuminating direction or illuminating range, the larger illuminating direction or illuminating range can take precedence. For example, when attempting to reflect information on the steering state of the cruising vehicle on illumination control, an illumination control which matches the driving conditions and actual driving path conditions can be implemented by giving precedence to the steering angle or the like.

Further, with a view to solving the problems, according to the invention, there is provided a vehicle lighting system in which position data of a plurality of nodes situated ahead of and behind the current position of a cruising vehicle are read using current position data of the vehicle and road map data to estimate the shape of a driving path by connecting the plurality of nodes via an interpolation process, and in the event that a curved path, a bent path or an intersection exists on the driving path in a traveling direction of the cruising vehicle, a driving path segment extending from an entry point where the cruising vehicle enters the curved path, bent path or intersection to an exit point where the cruising vehicle exits therefrom is divided into a plurality of segments for illumination control of a vehicle headlamp according to the respective segments so divided, the vehicle lighting system comprising the following devices.

Namely, the devices include:
a cruising vehicle current position detecting device for detecting a vehicle current position on the driving path by making use of a satellite communication or a road-to-vehicle communication;
a vehicle steering state detecting device for detecting a steering angle or a traveling direction of the cruising vehicle;
a driving path shape change detecting device for detecting the existence of a curved path, a bent path or an intersection from a shape change in the shape of a road path ahead of the cruising vehicle;
a driving path segment dividing and setting device for dividing a driving path segment extending from an entry point where the cruising vehicle enters a curved path, a bent path or an intersection to an exit point where the cruising vehicle exits therefrom into a plurality of segments; and
an illumination control device for changing the illuminating direction, illuminating range or illuminating light quantity of the vehicle headlamp based on illumination control outputs according to characteristics of the plurality of segments so divided and information detected by the vehicle steering state detecting device, when the cruising vehicle runs on the segments.

Consequently, in the invention, the contents of the illuminating control can be modified according to the characteristics of the driving path segment when the vehicle runs on the curved path and the like, whereby in the type of configuration in which only shapes of driving paths are dependable, the effects on the illumination control attributed to the insufficient accuracy of the map matching and erroneous recognition thereby can be relaxed.

According to the invention, an illumination control according to the driving position and steering state of the vehicle on a curved path can be realized, and a control is made possible which does not make the driver feel a feeling of physical disorder or uncomfortableness within a limited range of control accuracy.

Then, according to a configuration in which the segments divided by the driving path segment dividing and setting device are divided into an entry segment into a curved path, a bent path or an intersection, a steering maintaining segment where a steering state taken towards a certain direction is maintained and an exit segment from the curved path, the bent path or the intersection, the contents of the control can be modified according to the results of distinguishing driving path segments into predetermined models.

In an illumination control in which information detected on the vehicle steering state is reflected in addition to the driving path estimation, in the entry segment, a control quantity for an illuminating direction or illuminating range set at an entry point into a curved path, a bent path or an intersection is compared with a control quantity for an illuminating direction or illuminating range calculated based on information on the steering state detected by the vehicle steering state detecting means, so that in the event that the illuminating direction or illuminating range of the vehicle headlamp is controlled in accordance with a greater one of the two control quantities, a forward illumination can be obtained which matches actual conditions. In addition, in the steering maintaining segment, a type of configuration is preferable in which the illuminating direction or illuminating range of the vehicle headlamp is controlled in accordance with a control quantity for an illuminating direction or illuminating range calculated based on information on the steering state detected by the vehicle steering state detecting means a control quantity.

DESCRIPTION OF THE PREFERRED EMBODIMENTS

Embodiments of the present invention will be described hereinbelow by reference to the drawings. Unless otherwise specifically defined in the specification, terms have their ordinary meaning as would be understood by those of ordinary skill in the art.

Figure 1:
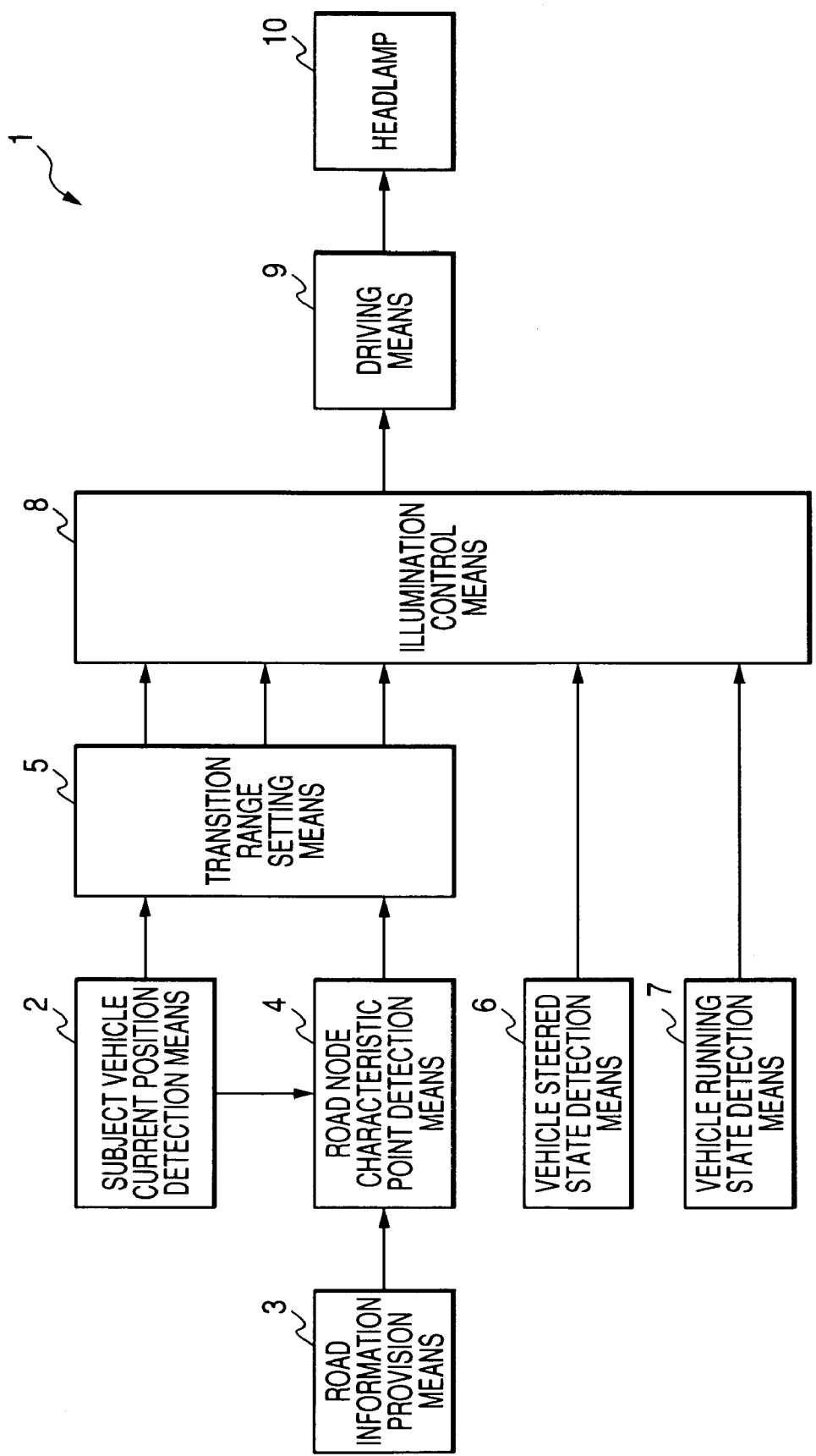
FIG. 1 is a drawing showing a basic configuration of the invention.

FIG. 1 is such as to show the first embodiment of a basic configuration of the invention.

A vehicle lighting system 1 is such as to control headlamps of a vehicle while estimating the shape of a road on the periphery of the current position of the cruising vehicle using a road map database and includes the following constituent elements (numerals within parentheses denote reference numerals).

A cruising vehicle current position detecting device (2)
A road information providing device (3)
A road node characteristic point position detecting device (4)
An easement or transition range setting device (5)
A vehicle steering state detecting device (6)
A vehicle driving state detecting device (7)
An illumination control device (8)
A driving device (9)
Vehicle headlamps (10)

The cruising vehicle current position detecting device 2 is provided for obtaining information on the current position of the cruising vehicle and a navigation system making use of GPS (Global Positioning System) employing an artificial satellite communication and a road-to-vehicle communication is raised as an example thereof. Then, current position data so obtained are sent out to the road node characteristic point position detecting device 4 and the transition range setting device 5.

The road information providing device 3 is considered to be necessary to obtain information on a driving path using a road map database, and, for example, road map data provided from a recording medium such as CD-ROM or DVD-ROM are sent to the road node characteristic point position detecting device 4.

The road node characteristic point position detecting device 4 reads position data of a plurality of nodes situated ahead of and behind the current position of the cruising vehicle using the current position data of the cruising vehicle and the road map database to thereby estimate the shape of the driving path by connecting the plurality of nodes through an interpolation processing and obtains the position of a road node characteristic point recognized as a point of change in the shape of the driving path. Note that raised as the road node characteristic point are a point of bending or a point of inflection which is related to the shape of a road path and a starting point and a terminating point (exit point) of a curved path. Namely, the detection of the position of a road node characteristic point is considered to be necessary to grasp an accurate notation point on the road map with regard to the shape of the driving path of the cruising vehicle and is important for example, when determining an initiating point and a terminating point of a curved path or ensuring the detection of an inflection segment including the point of inflection.

Specific contents of the processing within the road node characteristic point position detecting device 4 are as follows.

(1) To read position data on a plurality of nodes situated ahead of and behind the current position of the cruising vehicle using the data on the current position of the vehicle from the cruising vehicle current position detecting device 2 and the road map data of the road information providing device 3.

(2) To determine the characteristics of each link formed by connecting adjacent nodes of a plurality of nodes related to the cruising vehicle driving path, for example, the shape characteristics including linearity and curvature characteristics and the type of a driving segment.

(3) To generate shape data on the shape of a road path made as a model by connecting a plurality of nodes related to the cruising vehicle driving path through an interpolation processing.

(4) To carry out analysis and determination on the road node characteristic point.

Note that information on the detection of the position of the road node characteristic point is sent to the transition range setting device 5.

The transition range setting device 5 sets a transition range ahead of and behind the road node characteristic point based on the cruising vehicle current position information and road node characteristic point position detection information (a specific setting method will be described later on) and sends out information showing the range to the illumination control device 8 together with the cruising vehicle current position information and road node characteristic point position detection information.

The vehicle steering state detecting device 6 detects the steering state of the cruising vehicle or traveling direction (orientation) thereof. For example, a detecting device, such as a steering sensor or an angular speed sensor, detects the steering state of the vehicle including a turning direction of the vehicle, and sends out the detected information to the illumination control device 8. Alternatively, the device sends out to the illumination control device 8 an azimuth angle variation that is detected using an orientation sensor such as a gyro sensor.

The vehicle driving state detecting device 7 detects the vehicle speed or acceleration of the cruising vehicle and sends out the results of the detection to the illumination control device 8. For example, the current vehicle speed data are necessary to calculate a driving time required for the vehicle to reach a road node characteristic point or an intersection.

The illumination control device 8 processes information from the relaxation setting device 5, the vehicle steering state detecting device 6 and the vehicle driving state detecting device 7 and sends out an illumination control output according to the driving conditions to the driving device 9 to thereby execute an illumination control of the vehicle headlamps 10. Then, the illumination control device 8 changes gradually the control quantity related to the illumination control of the vehicle headlamps when the cruising vehicle runs through the transition range which is regulated ahead of and behind the road node characteristic point.

In the application of the invention, for example, a type of configuration is taken in which ECU's (electronic control units) are linked with an in-vehicle LAN (Local Area Network), which will be described below.

- A type of configuration in which cruising vehicle current position information and road information are sent to a navigation ECU to detect the road node characteristic point position and perform a transition range setting process, and, in addition, information detected on the vehicle steering state and information detected on the vehicle driving state are sent to an illumination control ECU for process, whereby the illumination control ECU, which receives the results of the processing by the navigation ECU via the LAN, controls the direction and range of illumination and adjustment of luminous intensity or dimming of the headlamps and changes the colors of the light sources.
- A type of configuration in which the navigation ECU takes on part or most of the processes allocated to the illumination control ECU (the necessity of the illumination control ECU is obviated or a minimum level of processing necessary for illumination control is carried out by the illumination control ECU).
- A type of configuration in which the navigation ECU simply outputs map data, current position data and the like, whereas the illumination control ECU performs all the processing including the processing for detecting the road node characteristic point position and setting the transition range.

Note that in a case where a vehicle current position correcting device is provided in order to improve the matching accuracy in the configurations, the control accuracy can be increased by correcting the vehicle current position data as appropriate based on, for example, the data on the shape of a road path and detected data from the orientation detecting device (gyro-sensor or the like).

Figure 2:
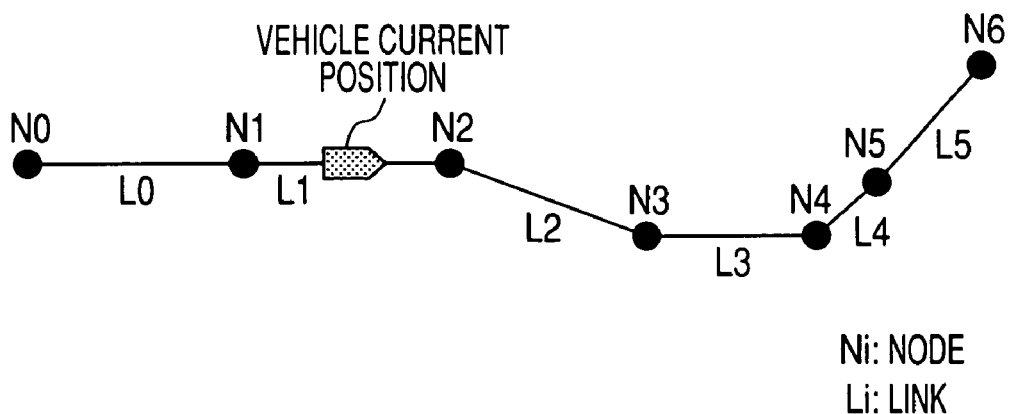
FIG. 2 is an explanatory drawing of the definition of nodes and links.

Firstly, using FIG. 2, the definition of node and link, which are necessary to grasp the shape of a road path related to the cruising vehicle driving path, will be described below.

In the drawing, "Ni" (i=0, 1 to 6) denotes an ith node, and "Li" (i=0, 1 to 5) denotes an ith link. In this embodiment, a link resulting by connecting two adjacent nodes Ni and Ni+1 is defined as Li (the length of Li, that is, the link length is not always constant).

A symbol shown as something like a home plate in the drawing denotes the current position of the vehicle (the orientation of a pointed portion indicates the traveling direction), and a node N1 existing behind the symbol is defined as a "current node", whereas a node N2 situated ahead thereof is defined as a "forward node". In addition, as to links, a link on which the vehicle resides, that is, a link L1 which connects the respective nodes N1 and N2 is defined as a "current link" and a link L2 ahead thereof is defined as a "forward link."

Position data with regard to the plurality of nodes which are situated ahead of and behind the cruising vehicle current position are read so as to determine a segment characteristic for each link, and any of, for example, a curved segment, an inflected segment (including a point of inflection) and a rectilinear segment.

In a road map database that is used for a navigation system, for example, the following characteristic features are recognized as existing between the dotting characteristics of nodes and the shape characteristics of a road path.

- A node dotting interval becomes coarse (and hence, the link length becomes large) along a rectilinear path, whereas the node doting interval becomes dense along a curved path.
- As to the node dotting interval in a curved segment, the node dotting interval becomes shorter as the grade of a road becomes lower (a designed vehicle speed value is small), and the node dotting interval becomes relatively long in an entering initiation segment to a curved path and an exit (termination) segment from the curved path, while the node dotting interval becomes short at a center of the curved segment.

The results of illustration of road types vs node intervals (link lengths) for specific segments will be shown in a table below.

TABLE 1

| Target roads | Designed Road Speed at Segment/sec (/hr) | Specific Segment Node Interval (Link Length) | | |
|---|---|---|---|---|
| | | Rectilinear Segment | Inflected Segment | Curved Segment |
| A | 11.1 m/sec (40 km/hr) | 5 times or more | 3 to 5 times | 3 times or less |
| B | 16.7 m/sec (60 km/hr) | 7 times or more | 5 to 7 times | 5 times or less |
| C | 22.2 m/sec (80 km/hr) | 10 times or more | 5 to 10 times | 5 times or less |

Note that in the above table, the node intervals are shown as multiples of values resulting when the designed road speeds are converted into those per second. In addition, bent paths are included in the inflected segment in the table above.

When distinguishing between road segments according to designed vehicle speeds or grades of roads, it is possible to distinguish between a rectilinear path, a curved path or an intermediate roadway in-between (an inflected segment or a bent path) by making use of the node intervals.

As types of distinguishing between segments of a driving path, for example, the following methods are raised, and the methods can be used alone or be combined as appropriate for use.

(a) A type of configuration in which a link length is compared with a reference distance that is determined from a legal speed limit for a driving path to there by distinguish between the segments of the driving path.

(b) A type of configuration in which outer products of link lengths and link vectors are used to distinguish between segment characteristics of links.

(C) A type of configuration in which segments properties of links are distinguished based on sign changes of radii R that are calculated using nodes at three points which are adjacent to each other through an arc interpolation and R values (absolute values).

Firstly, in (a), for example, a link length between adjacent nodes is compared with a reference distance value that has been determined in advance based on a legal speed limit which is converted into a speed per second. This reference distance value can be defined as a constant multiple of a value converted into a speed per second by referring to Table 1. For example, in the case of a vehicle speed of 80 km/h, when a reference distance value is regulated which corresponds to 10 times a value of speed per second, in case the length of a link is equal to or longer than the reference distance value, a segment of the driving path which is related to the link is distinguished as a rectilinear segment. In addition, in the event that the length of the link is less than 10 times the value of speed per second, the segment of the driving path which is related to the link under determination is distinguished as an inflected segment (more than 5 to less than 10 times) or a curved segment (5 times or less). In this configuration, the method is simple as link length only has to be compared with reference distance, but (a) is preferably combined with (b) or (c) to have a better accuracy.

In (b), the type of a segment of a driving path which is related to a target link can be determined by obtaining a sign change of an outer product of link vectors which are each obtained as a difference between the length of a link between adjacent nodes and a position vector of the same nodes. Namely, when an outer product of a link vector corresponding to a link "Li−1" and a link vector corresponding to a link "Li" is expressed as "Li−1×Li" and an outer product of the link vector corresponding to the link "Li" and a link vector corresponding to a link "Li+1" is expressed as "Li1×Li+1", segments extending over the 3 links (4 nodes) can be determined by grasping how the signs thereof change. For example, values of both the outer products are zero in the rectilinear segment, whereas in the inflected segment, the sings of the outer products change from positive to negative (or negative to positive).

In (c), since radius of curvatures Ri−1, Ri, Ri+1, . . . can be known by applying an arc interpolation on nodes at 3 points which constitute 2 adjacent links, the type of a segment of a driving path which is related to a target link can be determined by obtaining sign changes of the radius of curvatures and absolute values. For example, in the event that the radius of curvature of a link is equal to or greater than a reference value (1000 m or the like) which has been determined in advance, the relevant link is determined as a rectilinear segment. Alternatively, in the event that the radius of curvature of the link is less than the reference value which has been determined in advance and the sign of the radius of curvature change from positive to negative (or from negative to positive), the relevant link is determined as the inflected segment or the like.

In (b) and (c), the types of segments of a driving path can be distinguished with good accuracy using vector products and radius of curvatures.

Next, the following detection methods with regard to road node characteristic points will be described.

(I) Detection method for detecting a starting point and a terminating point of a curved path (II) Detection method for detecting a point of bending of a bent path Firstly, as to (1), the following methods can be raised for example.

(1-1) A method in which link lengths, link distance ratios and inner product angle (bending angle) between a current position link and a forward link are used.

(1-2) A method in which nodes are dotted at 3 points in such a manner as to include a current position link and radius of curvatures obtained through an arc interpolation are used.

(1-3) A method in which the methods of (1-1) and (1-2) are used in parallel.

Figure 3:
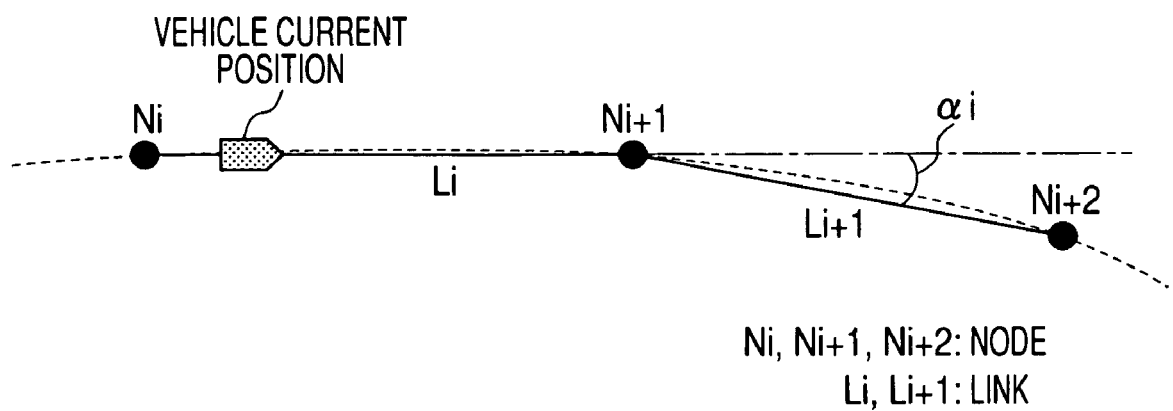
FIG. 3 is a drawing which explains a detection method of a starting point and a terminating point of a curved path.

FIG. 3 is an explanatory diagram of the method of (1-1) above, which shows nodes Ni, Ni+1, Ni+2.

"Ni" denotes a current node, "Ni+1" denotes a forward node, Li, which connects Ni and Ni+1, denotes a current position link, and Li+1, which connects Ni+1 and Ni+2, denotes a forward link.

Nodes can be distinguished using the following conditions A, B1, B2, C based on the results of a comparison of a link length |Li| or |Li+1| with their reference values (denoted as "sh1"), the results of a comparison of a link distance ratio "|Li|/|li+1|" or "|Li+1|/|Li|" with their reference values (denoted as "sh2a", "sh2b") and the results of a comparison of a bending angle "αi" (an angle formed between an extension of Li and Li+1, that is, corresponding to an inner product angle between link vectors) with its reference value (denoted as "sh3") ("||" means a logical sum (OR)).

| | |
|---|---|
| (|Li|≧sh1)||(Li+1)≧sh1) | Condition A |
| |Li|/|Li+1|≧sh2a | Condition B1 |
| |Li+1|/|Li|≧sh2b | Condition B2 |
| α1<sh3 | Condition C |

In case Conditions A and B1 and C are established, the forward node "Ni+1" (an intermediate node of the 3 nodes Ni, Ni+1, Ni+2) is determined as a node at a starting point of a curved path.

In case Conditions A and B2 and C are established, the forward node "Ni+1" (an intermediate node of the 3 nodes Ni, Ni+1, Ni+2) is determined as a node at a terminating point (or exit point) of the curved path.

By paying attention to the fact that the node at the starting point or terminating point of the curved path has on one side thereof a link having the length of a rectilinear segment or the length of an inflected segment, while the other link of the node has the length of a curved segment and that the value of a bending angle becomes a predetermined value or greater, for example, the link lengths of rectilinear segment, inflected segment and curved segment can be made to be defined, respectively, to be 7 times or more, 5 times or more, and less than 5 times a designed road speed (expressed by a value converted into a vehicle speed per second) of the driving road. Then, by adopting further a determination method which additionally takes ratios between link lengths and bending angles into consideration, a more accurate node detection is made possible.

In addition, when "&&" is denoted as a logical product (AND), while in the embodiment, the conditions "A&&B1&&C" and "A&&B2&&C" are used, the invention is not limited thereto but may be able to use, as appropriate, a composite condition such as resulting by combining, for example, the conditions "A&&(B1||C)" and "A&&(B2||C)" or the conditions "A&&B1", "A&&B2".

Figure 4:
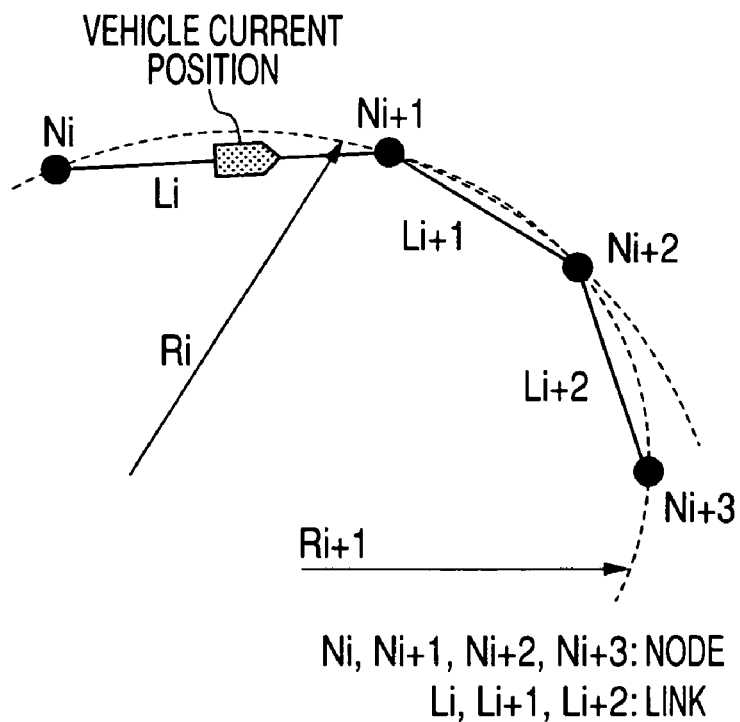
FIG. 4 is a drawing which explains another detection method of a staring point and a terminating point of a curved path.

FIG. 4 is an explanatory diagram of the method of (1-2) above, which shows nodes Ni, Ni+1, Ni+2.

"Ni" denotes a current node, "Ni+1" denotes a forward node, Li, which connects Ni and Ni+1, denotes a current position link, and Li+1, which connects Ni+1 and Ni+2, denotes a forward link.

When a radius of curvature resulting through the application of a 3-point arc interpolation using position data of each of nodes Ni, Ni+1, Ni+2 at 3 points including the current node is denoted as "Ri", a radius of curvature resulting the application of the 3-point arc interpolation using position data of each of nodes Ni+1, Ni+2, Ni+3 at next 3 points is denoted as "Ri+1", and a radius change is defined by "$\Delta Ri = Ri - Ri+1$", nodes can be distinguished using conditions D, E1, E2, which will be described below, from the results of a comparison of "Ri" with its reference value ("sh4") and the tendency to increase or decrease of $\Delta Ri$.

$Ri \geq sh4$    Condition D $\Delta Ri$ decreases in a monotone fashion    Condition E1

$\Delta Ri$ increases in a monotone fashion    Condition E2

In the event that Conditions D and E1 are established, the forward node "Ni+1" (an intermediate node of the 3 nodes Ni, Ni+1, Ni+2) is determined as a node at a starting point of a curved path.

In the event that Conditions D and E2 are established, the forward node "Ni+1" (an intermediate node of the 3 nodes Ni, Ni+1, Ni+2) is determined as a node at a terminating point of the curved path.

In addition, the shape of a road path normally constitutes a clothoid in a curved segment, and as to a radius of curvature thereof, an R value becomes large at an entry point of the curved segment, whereas the R value becomes small at the center of the curved segment. Consequently, a method is effective in which the tendency to increase or decrease of the R value is studied through the application of the 3-point arc interpolation. Note that various types can be used for this purpose, and, for example, in place of $\Delta Ri$, the tendency to increase or decrease of "$\log(|Ri-Ri+1|)$" can be studied using a logarithm "$\log(\ )$".

In addition, as to the value of sh4, there are a method using a fixed value and a method using a variable set value. In the case of the latter, for example, the relevant value can be set according to the road grade of the driving road. As an example, a threshold for the value is set to on the order of 1000 m on highways or roads built exclusively for automobiles, and the threshold is set to on the order of 500 m on general roads. Note that R=1000 m ($\approx$ a minimum road curve radius for of a vehicle speed of 140 km/h) on a highway is physically felt by the driver as being rectilinear, and an R value which makes the driver feel rectilinear on a general road is on the order of 500 m ($\approx$ a minimum road curve radius for of a vehicle speed of 100 km/h).

While the methods under (1-1) and (1-2) can be used alone, the distinguishing accuracy can be increased by using both the methods in parallel as appropriate.

Figure 5:
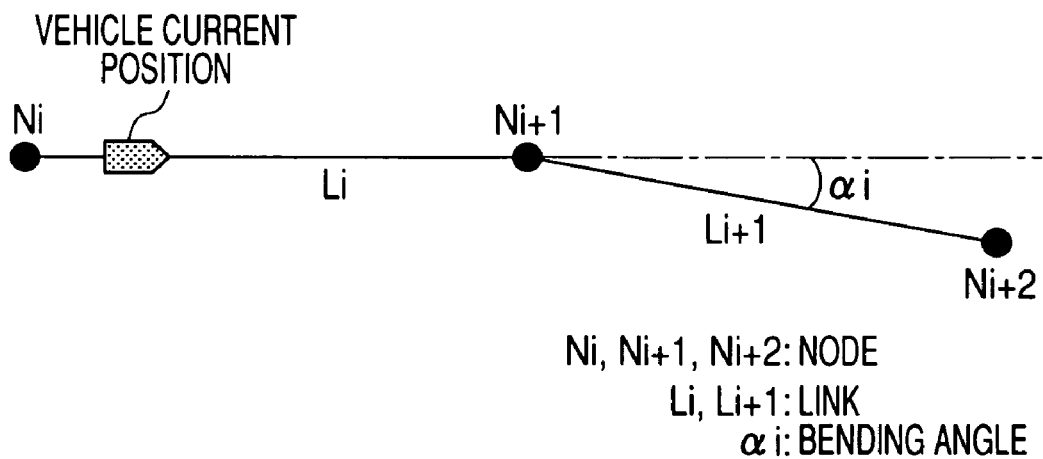
FIG. 5 is a drawing which explains a detection method of a bending point of a bent path.

Next, the detection method of (II) will be described below (refer to FIG. 5).

In nodes Ni, Ni+1, Ni+2 at 3 points shown in the drawing, let "Ni" denote a current node, "Ni+1" denote a forward node, Li, which connects Ni and Ni+1, denote a current position link and Li+1, which connects Ni+1 and Ni+2, denote a forward link, and nodes can be distinguished using, for example, the following conditions F, G, H based on the results of a comparison of a link length |Li| or |Li+1| with their reference values (denoted as "sh1"), the results of a comparison of a link distance ratio "|Li+1|/|Li|" (or |Li|/|Li+1|) with its reference value (denoted as "sh2") and the results of a comparison of a bending angle "$\alpha i$" (an angle formed between an extension of Li and Li+1 or corresponding to an inner product angle between link vectors) with its reference value (denoted as "sh3").

$(|Li| \geq sh1) \&\&(|Li+1| \geq sh1)$    Condition F $|Li+1|/|Li| \geq sh2$    Condition G $\alpha i \geq sh3$    Condition H In the event that Conditions F and G and H are established, the forward node "Ni+1" (an intermediate node of the 3 nodes Ni, Ni+1, Ni+2) is determined as a node at a bending point.

In the node at the bending point of a bent path, links situated on both sides thereof each have the link length of a rectilinear segment, or the links are constituted by a combination of a link having the length of a rectilinear segment and a link having the length of an inflected segment or a combination of links each having the link length of an inflected segment. Then, taking into consideration a fact that the bending angle $\alpha i$ has become a predetermined value or greater, the link lengths of the rectilinear segment and the inflected segment are defined, respectively, to be 7 times or more and 5 times or more to less than 7 times a designed road speed (expressed by a value converted into a vehicle speed per second) of the driving path, and the bending angle $\alpha i$ is further taken into consideration, so that the node at the bending point can be distinguished with greater accuracy.

Thus, as has been described heretofore, while the road node characteristic point can be distinguished, due to the effects of the measuring accuracy of the orientation of the current position of the cruising vehicle or the accuracy of the map database itself, it is not possible to know accurately on which link ahead of or behind the characteristic point the vehicle is located, leading to a problem that the illumination control of the lighting system may be affected by such an error in location of the current position of the cruising vehicle.

To cope with this, the invention adopts a type of control, which will be described below.

(A) A type in which a transition range (a slowly changing range) is set in the vicinity of a road node characteristic point in consideration of the accuracy or error range of the GPS navigation system, so that when the cruising vehicle is anticipated to exist within the transition range, the illuminating direction or range is slowly or gradually changed.

(B) A type in which a driving path range (driving path segment in transition) is regulated by setting osculating circles for links situated on both sides of a road node characteristic point, so that the illuminating direction or range is changed according to a change in the shape of a driving path.

Figure 6:
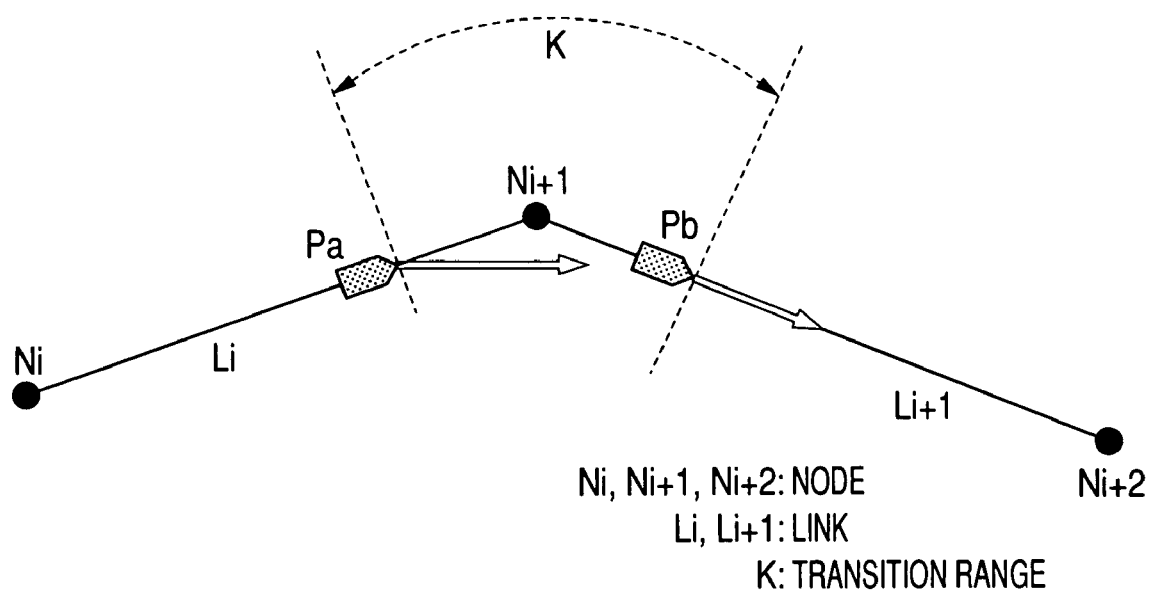
FIG. 6 is a drawing which shows, together with FIG. 7, an example of setting a transition range and in which a bent path is illustrated.
Figure 7:
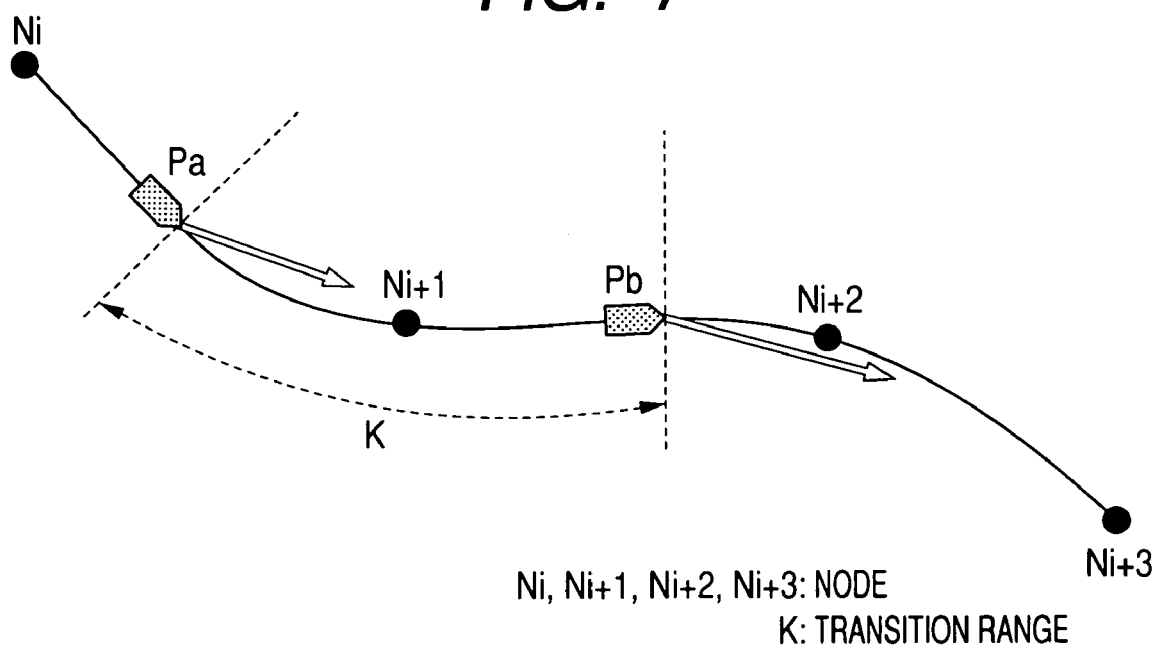
FIG. 7 is a drawing illustrating the periphery of an exit point of a curved path.

Firstly, the type under (A) will be described by reference to FIGS. 6, 7. Note that FIGS. 6 and 7 illustrate exit points of a bent path and a curved path, respectively, a node Ni+1 indicates a road node characteristic point, a point "Pa" indicates a starting point of a transition range K, and a point "Pb" indicates a terminating point of the transition range K.

Interpolation processings used for shape generation of road paths include the 3-point arc interpolation process, bisecting osculating circle process and Newton's 4-point forward interpolation process, and a smoothing process like one which will be described later on is used in a segment to which the use of those processes is inappropriate.

In the event that it is found as a result of the estimation of the shape of a driving path that there exists a curved or bent path, a control is carried out based on the following procedures.

(A1) Distinguish a node indicating a starting position or terminating position in a curved path or a node indicating a bending position in a bent path.

(A2) Regulate an easement or transition range K in such a manner as to include the node distinguished under (A1) (refer to the points Pa, Pb).

(A3) Change slowly a control quantity related to the illuminating direction or range of the headlamps from a point in time when the cruising vehicle passes through the starting point (the point Pa) to enter the range until a point in time when the cruising vehicle passes through the terminating point (the point Pb) to exit the range.

Figure 8:
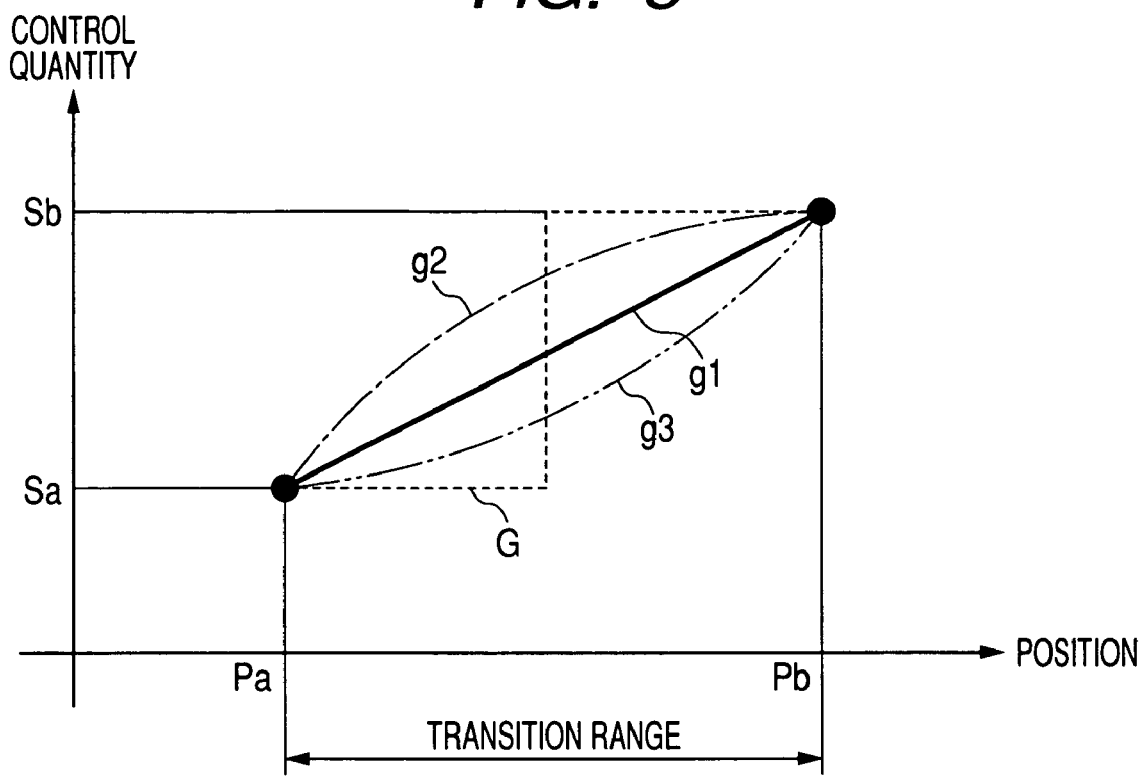
FIG. 8 is a graph showing an illumination control example.

FIG. 8 shows a graph illustrating an example of control in which the axis of abscissas indicates the position of the cruising vehicle, whereas the axis of coordinates indicates control quantity, and "Sa" indicates a control quantity at the point Pa and "Sb" a control quantity at the point Pb.

A smooth change in control quantity is preferable as shown by a solid graph curve g1 in which the control quantity is changed linearly from Sa to Sb or by graph curves g2, g3 in which the control quantity is changed in a curved fashion from Sa to Sb (it is not preferable that the control quantity is changed largely from Sa to Sb in the vicinity of the node Ni+1 as shown by a dotted line G, since such a large change in control quantity makes the driver feel a feeling of physical disorder).

In addition, while the transition range K is set in the vicinity of the forward node in the event that the forward node is distinguished as the road node characteristic point, it is preferable in consideration of the measuring accuracy of the orientation of the current position to set the transition range to a distance of +/−10 m or greater (in total, 20 m or greater), and it is appropriate to set the range at a place like the exit point of the bent or curved path (this is because it is not appropriate to set the range at a place of the curved path where nodes are densely located). In addition, as to the distance of the transition range, there are raised two methods; one in which the distance is set to a fixed value, the other in which a variable value is used which changes according to the vehicle speed).

In the type (A), for example, an optimum illuminating direction at the point Pa and an optimum illuminating direction at the point Pb are calculated, respectively, and within the transition range K, the illuminating direction is slowly or gradually changed depending on the distance covered by the vehicle within the range, thereby making it possible to achieve a proper illumination control without being affected by the map-matching accuracy.

In addition, as to a driving path within the transition range K, in case an appropriate osculating circle radius is set by referring to a table 2 (a relationship between designed road speeds and radii of course shapes of a road in designing the same) below, a better illumination control can be realized.

TABLE 2

| | Designed Road Speed at Segment (km/hr) | | | |
|---|---|---|---|---|
| | 40 | 60 | 80 | 100 |
| curvature radius (m) | 60 | 150 | 260 | 460 |

Next, the type under (B) will be described below.

Figure 9:
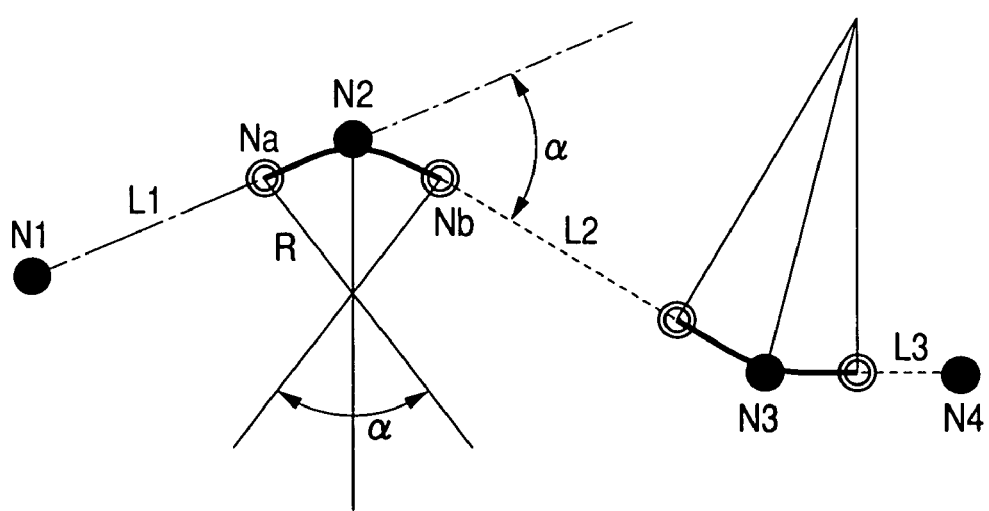
FIG. 9 is an explanatory drawing of a smoothing process.

FIG. 9 is an explanatory diagram of a smoothing process.

It is preferable to apply a process in which links are smoothly connected to each other using an arc of a predetermined radius R in the vicinity of a bending point indicated by N2 to a segment in which links having long link lengths like L1, L2 are connected in a bent fashion (a bent segment).

An "α" shown in the diagram denotes an angle formed between the links L1 and L2. When the angle of a bent segment is represented using the α, it is desirable that the value of the radius R is set to a value which is slightly larger than the radius of the shape of a designed road path (for example, in the case of a road whose designed road speed is 40 km/hr, R=on the order of 30 m, and a gap distance between the bending point and the arc (R) is set so as not to exceed the width of a lane).

It is preferable to define in detail the shape of the driving path in the segment to which the smoothing process was applied by generating new nodes as shown by Na, Nb. The driving path shape is expressed by "d=R·(α/2)", when an arc distance between the new node and a vertex of the arc (R) in the vicinity of the bending point is denoted as "d".

Figure 10:
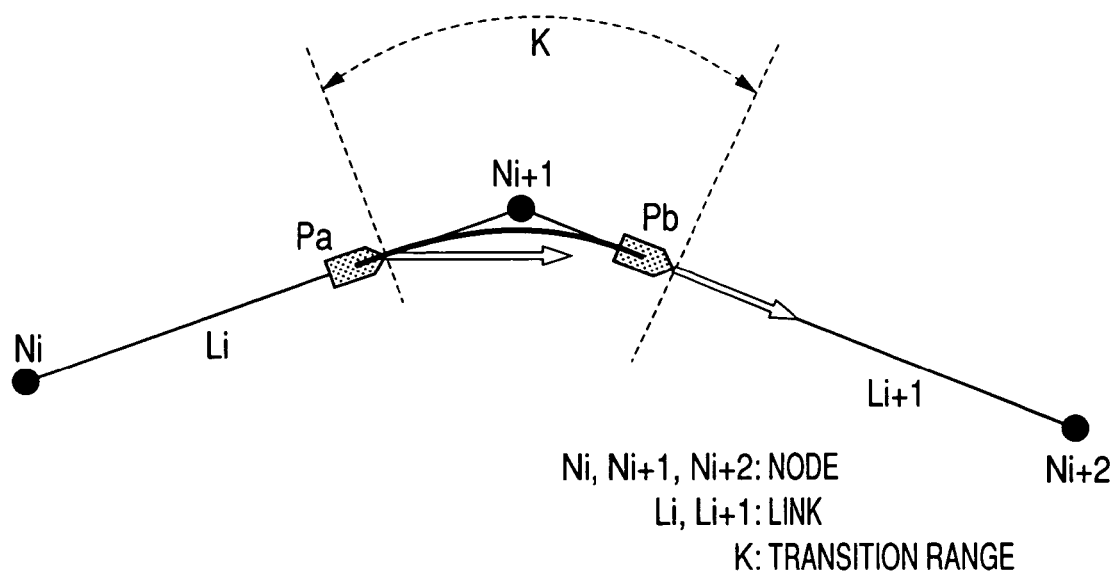
FIG. 10 is a drawing which shows a transition range setting example when the smoothing process is applied to the vicinity of a bending point of a bent path.
Figure 11:
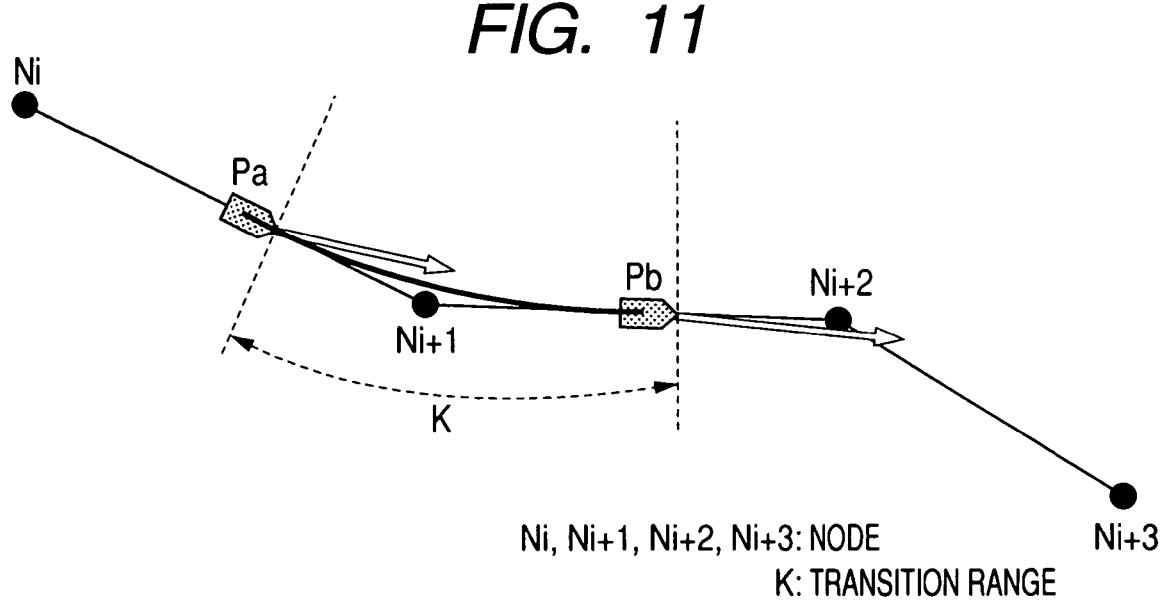
FIG. 11 is a drawing which shows a transition range setting example when the smoothing process is applied to the vicinity of an exit point of a curved path.

FIG. 10 illustrates a case where a smoothing process is applied to a node at a bending point of a bent path, and FIG. 11 illustrates a case where a smoothing process is applied to a node at an exist point of a curved path. In the drawings, a node Ni+1 denotes a road node characteristic point, and a point "Pa" denotes a starting point of a transition range K, a point "Pb" denoting a terminating point of the transition range K. (Note that each point is determined as a point of intersection between an osculating circle (an arc) and each link).

In the event that it is determined as a result of the estimation of the shape of the driving path that there exists a curved or bent path ahead of the cruising vehicle, the control is carried out in the following procedures.

(B1) Distinguish a node indicating a starting position or terminating position in a curved path or a node indicating a bending position in a bent path.

(B2) Specify a link that is formed by connecting the node so distinguished under (B1), respectively, to nodes situated ahead of and behind the node in the traveling direction of the cruising vehicle.

(3) Regulate a driving path (a arc-like driving path) which corresponds to a transition range by setting an arch which touches both the links, so that a control quantity related to the illuminating direction or range of the headlamps is changed according to a change in the shape of the driving path.

In this embodiment, it is not possible to be free from effects from the map-matching accuracy, it is desirable to improve the accuracy, for example, by performing a correction process on the current position of the vehicle in accordance with the following procedures.

(1) Calculate an estimation range for a change in orientation within the current link based on a shape equation of a road path shape which is estimated from road shape data generated through interpolation of nodes.

(2) In the event that orientation detection data related to the cruising vehicle deviates from the estimation range so calculated under (1), determining that the cruising vehicle current position does not exist on the current link, another link situated on the periphery of the current link is then made to be the target for continuation of the correction process on the current position of the cruising vehicle.

(3) In the event that orientation detection data related to the cruising vehicle falls within the estimation range so calculated under (1), a position correction is executed by estimating a position which is considered to be the same as the orientation detection data or oriented most closely to the data on the current link as the current position of the cruising vehicle.

(4) Return to (1) and repeat the process.

Figure 12:
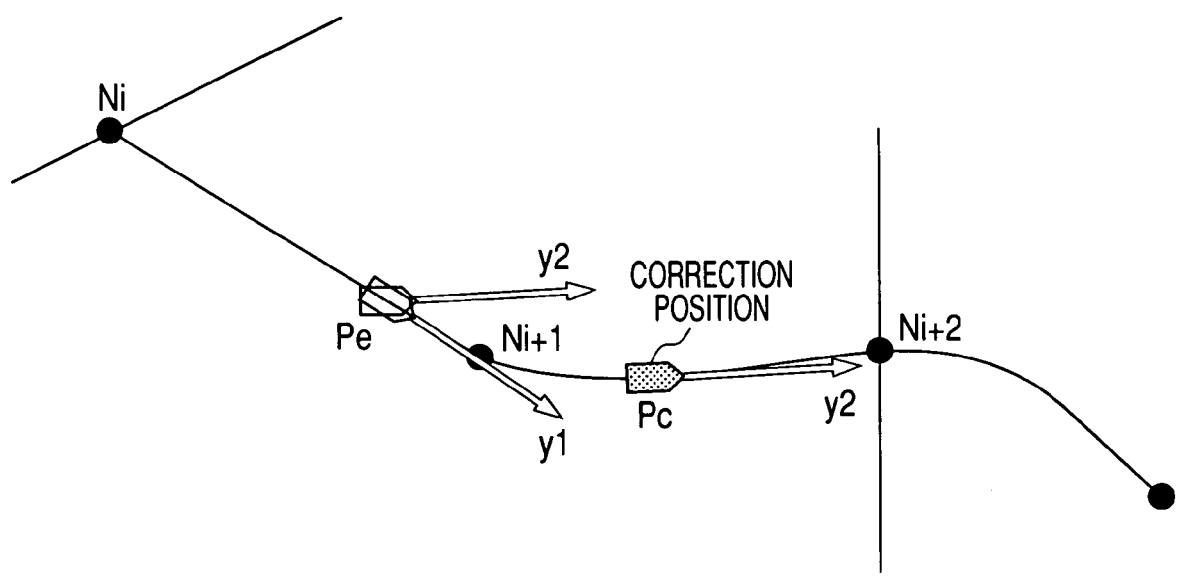
FIG. 12 is a drawing which explains a correction of the current position of a cruising vehicle.

FIG. 12 illustrates how a correction is performed at a point "Pc" on a driving path according to the procedure described under (3) above in the event that there occurs a discrepancy between an orientation (refer to an arrow y1) which is estimated from a current position candidate indicated by a point "Pe" on the driving path and an orientation (refer to an arrow y2) which is detected actually by a GPS orientation sensor. Namely, the actual orientation deviates from the estimated range, and in this example, the position correction is performed by changing the estimation range from the current position link to the forward link.

Figure 13:
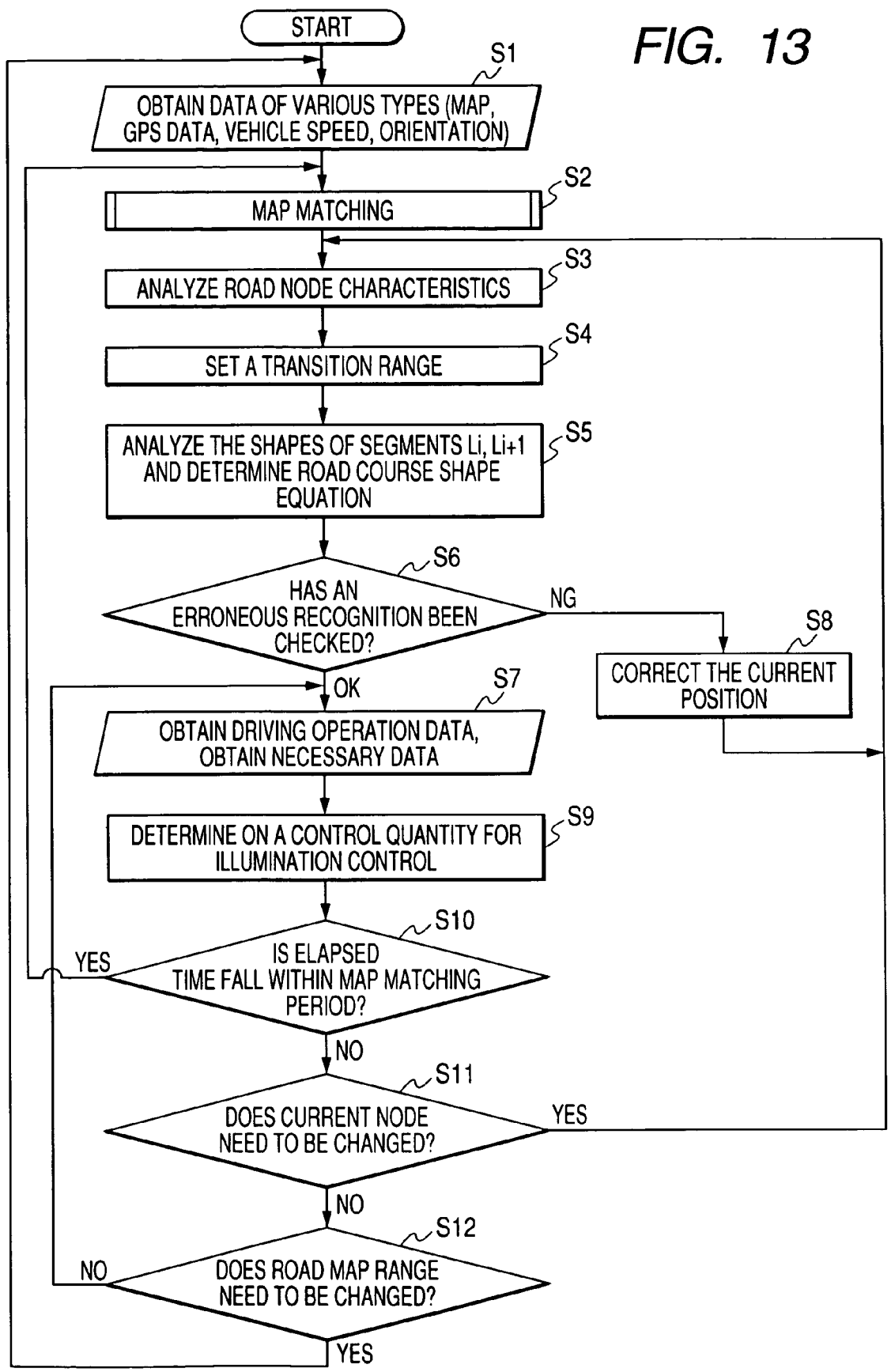
FIG. 13 is a flowchart showing an example of illumination control.

FIG. 13 is a flowchart illustrating a procedure for determining the shape of a road path by obtaining node position data and performing an illumination control using road path shape data. Note that in this example, a light distribution control will be described in which a road node characteristic point ahead of the cruising vehicle is detected through a combination of the types described before under (1-1) and (II) and the effects of the map-matching error are attempted to be avoided as much as possible by virtue of the type (A) and the correction of the current position of the vehicle.

Firstly, in step S1, necessary information described below is read into the system.

Road map data to be used by the navigation system
GPS data
Vehicle speed data
Orientation data (detection information by a rate gyro)

Next, in step S2, a map-matching is executed in accordance with the predetermined procedure, so that a road on which the cruising vehicle is currently driving is determined and the current position of the cruising vehicle on the road or driving path is estimated. At the same time, a group of nodes including a current node Ni, for example, candidates for (Ni−1, Ni, Ni+1, Ni+2, Ni+3) and a group of links, for example, candidates for (Li−1, Li, Li+1, Li+2, Li+3) are set, so that node position data and link vector data are collected.

In steps S3 to S5, segment characteristics of the current position link or the forward link are investigated, the characteristics of the forward node is distinguished (whether the characteristics thereof constitute a rod node characteristic point is checked), and a shape equation is determined for the driving path.

Firstly, in step S3, the link lengths of the current position link Li and the forward link Li+1 and an inner product angle of both the links are calculated, and the segment characteristics (curved segment, inflected segment, bent segment, rectilinear segment) of the respective links and the node characteristics of the forward node Ni+1 are distinguished.

For example, this is carried out as follows.

In the event that both Li and Li+1 are bent segments

In case the link lengths are $|Li| \geq Lmax$ and $|Li+1| \geq Lmax$ (here, "Lmax" is a distance reference value indicating a length resulting by multiplying a predetermined times a value resulting when a legal road speed limit is converted into a speed per second) and the bending angle (the inner product angle) between Li and Li+1 is a predetermined reference value or greater, the segment is determined as a bent path in which Ni+1 constitutes a node at the bending point or bending point node.

In the event that both Li and Li+1 are inflected segments

In case either of the link lengths $|Li|$, $|Li+1|$ is less than "Lmax" and the bending angle (the inner product angle) between Li and Li+1 is the predetermined reference value or greater, the segment is determined as an inflected path in which Ni+1 constitutes a node at the inflecting point or inflecting point node.

Next, in step S4, it is determined whether or not an easement or transition range is set for the forward node Ni+1. Namely, in the event that Ni+1 is the node at the inflecting or bending point, a transition range is set as has been described with reference to FIGS. 6, 7. Alternatively, an inscribed circle R is made to be tangent to the links Li, Li+1 based on Table 2 so as to implement a smoothing (note that a starting point or terminating point of a curved path may be obtained from interesting positions between the respective links and the osculating circle R).

In step S5, a shape equation for the road path shape is generated based on the set transition range and the segment characteristics of the links Li, Li+1.

For example, a process is executed in accordance with an algorithm, which will be described below.

(A1) In the event that both Li and Li+1 are curved segments, that is, the link lengths $|Li|$, $|Li+1|$ are a reference value or smaller (the reference value is a length resulting by multiplying a predetermined times a value resulting when a legal road speed limit is converted into a speed per second and is denoted as "Lmin"), =>a road shape equation is obtained using the 3-point arc interpolation process, bisecting osculating circle process or Newton's 4-point forward interpolation process.

(A2) In the event that both Li and Li+1 are rectilinear segments, that is, the link lengths $|Li|$, $|Li+1|$ are the reference value "Lmax" or greater =>when a link angle (an inner product angle) formed between Li and Li+1 is denoted as "$\alpha i$" and its reference angle is denoted as "$\alpha max$", if $\alpha i \geq \alpha max$, determining that the segment is a curved path in which the node Ni+1 constitutes the bending point, the osculating circle (R) is placed as has been described before so as to execute a smoothing process to thereby obtain a starting point and a terminating point of the curved path.

(A3) In other cases than (A1), (A2) (hereinafter, a distance from the current position of the cruising vehicle to the forward node Ni+1 is referred to as "D"), (A3-1a) In case of "$Li \geq Lmax$" and "$D \geq Lmin$"=>the segment is determined as a rectilinear path.

(A3-1b) In the event of "Li≧Lmax" and "D<Lmin", a road shape equation is defined by adopting either of what will be described below.

(A3-1b-1) Determine a driving path shape by letting Ni+1 be as the bending point and applying the bending angle α of the bent path and the osculating circle radii of Table 2, and obtain a starting point and a terminating point of the curved path.

(A3-1b-2) Letting Li be a rectilinear segment, and Ni+1, Ni+2, Ni+3 be curved segments, execute the 3-point arc interpolation.

(A3-2a) In the event that Li is an inflected segment in which "Li<Lmax" and "D≧Lmin", the segment is determined as a rectilinear path.

(A3-2b) In the event that Li is an inflected segment in which "Li<Lmax" and "D<Lmin", a road shape equation is defined by adopting any of what will be described below.

(A3-2b-1) Determine a driving path shape is determined by letting Ni+1 be as the bending point and applying the bending angle α of the bent path and the osculating circle radii of Table 2, and obtain a starting point and a terminating point of the curved path.

(A3-2b-2) Letting Li be a rectilinear segment, and Ni+1, Ni+2, Ni+3 be curved segments, execute the 3-point arc interpolation.

(A3-2b-3) Generate 2 nodes as re-disposition points on the outside of Ni, Ni+1 for the link Li, and the Newton's 4-point forward interpolation is executed.

In the event that Li is a curved segment in which "Li<Lmax" and Li+1 is a rectilinear or inflected segment, a road shape equation is defined by adopting either of what will be described below.

(A3-3-1) Obtain a bending angle αi of a bent path at Ni+1 by letting Ni+1 be a terminating point of the curved path or determine a bending point or a driving path shape by applying the osculating circle radii of Table 2 to Ni+1, and obtain a starting point and a terminating point of the curved path.

(A3-3-2) Generate 2 nodes as re-disposition points on the outside of Ni, Ni+1 for the link Li, and the Newton's 4-point forward interpolation is executed.

Note that the processes described above only constitute the examples, and it goes without saying that the processes can be executed in the respective types.

In step S6, an erroneous recognition of the map-matching is checked, and in step S8, a correction of the current position is executed. An orientation angle range at the current position link is calculated using a road shape equation for comparison with data of the rate gyro (orientation sensor). If no problem is found including the error of the rate gyro, then proceed to step S7. However, if there exists a large difference between the calculated orientation angle range and the data of the rate gyro, then proceed to step S8, where a position on the driving path which is closest to the orientation data within the error range of the rate gyro is set as the current position of the vehicle. As this occurs, the orientation of a link, Li−1 or Li+1, which is adjacent to or in the vicinity of the current position link on the map is compared with an orientation detected by the rate gyro, and the link which produces a smaller difference is adopted as the current position link (namely, the current node is put forward or backward by one. Then, the flow returns to step S3. In addition, in a type in which an erroneous position recognition is designed to be prevented by comparing a driving locus obtained from the GPS data, vehicle speed data and orientation data with a road shape on the road map, the steps S6 and S8 are not necessary.

In step S7, information necessary for illumination control of the headlamps, for example, driving operation data (data detected by the steering sensor or the like) are read. In addition, the GPS data, vehicle speed data, orientation data and the like are read as required. Then, in a next step S9, the following processes are executed.

(1) Modify the current position of the cruising vehicle according to a change in the distance covered by the cruising vehicle until then as time has gone by since the map-matching was executed.

(2) Determine whether or not the current position of the cruising vehicle resides within the transition range.

(3) In the event that the current position of the cruising vehicle does not reside within the transition range, calculate a control target at the current position of the cruising vehicle by referring to the results of the estimation of the shape of the driving path. In a lighting support system using a headlamp system of a light distribution control type, the direction of illumination light to be emitted and an illumination range thereof, and a light distribution can be changed freely, and a position is estimated which is to be reached by the cruising vehicle after a predetermined driving time has elapsed with regard to the cruising vehicle or a predetermined distance has been covered by the cruising vehicle so as to obtain a control target for a driving mechanism, thereby making it possible to control the illuminating direction or illuminating range or to control the illuminating direction with the clipping point of a curved path being regarded as a gazing point. Note that the clipping point is defined as a point of contact which results when a tangential line is drawn from the cruising vehicle position relative to a line defining the shoulder of the road or a center line thereof which is obtained from a shape line defining the shape of the driving path path (a point of intersection between the line defining the shoulder of the road or the center line thereof and the tangential line so drawn), and the angle at the clipping point means an angle formed between an axis extending in the traveling direction of the vehicle and a tangential line drawn from the line defining the shoulder of the road or the center line thereof and can be obtained using the road shape data (the path shape data) via a known method (an osculating circle method).

(4) In the event that the current position of the cruising vehicle is estimated to reside within the transition range, the illuminating direction and the illuminating range are slowly changed from a starting point to a terminating point of the transition range based on the current position of the cruising vehicle within the transition range and a difference between a target control quantity at the starting point and a target control quantity at the terminating point.

Note that by comparing the target control quantities obtained under (3) and (4) above with the current value, driving mechanisms of driving support systems of various types can be controlled, or information of various types which supports driving such as an alarm or warning issued at the time of entry into a curved path can be displayed.

In a next step S10, if the time that has elapsed until now is out of the map-matching period, the flow returns to step S2, whereas if the time is within the period, in step S11, the necessity is determined of changing the current node, and if the necessity is determined as positive, the flow returns to step S3, whereas if negative, the flow proceeds to step S12.

In step S12, the necessity is determined of changing the range on the road map, and if the necessity is determined as positive, the flow returns to step S1, whereas if negative, the flow returns to step S7.

In a configuration using an ECU (electronic control unit) incorporating a computer, for example, the aforesaid processes are realized as internal processing within the ECU using hardware such as CPU (central processing unit), memory, and input and output ports, as well as programs that are executed by the CPU.

According to the configurations that have been described heretofore, the following advantages can be provided.

As to the shape of the road path, which is the driving path of the cruising vehicle, that is required for the illumination control of the headlamps, since the shape characteristics, node characteristics and segment characteristics can be distinguished accurately and an appropriate illumination control can be ensured in the vicinity of the road node characteristic point, the driving safety can be enhanced without making the driver feel a feeling of physical disorder.

Since no high-degree interpolation processing is required in the estimation of the shape of a road path, there occurs no problem with the processing load imposed on the CPU.

Figure 14:
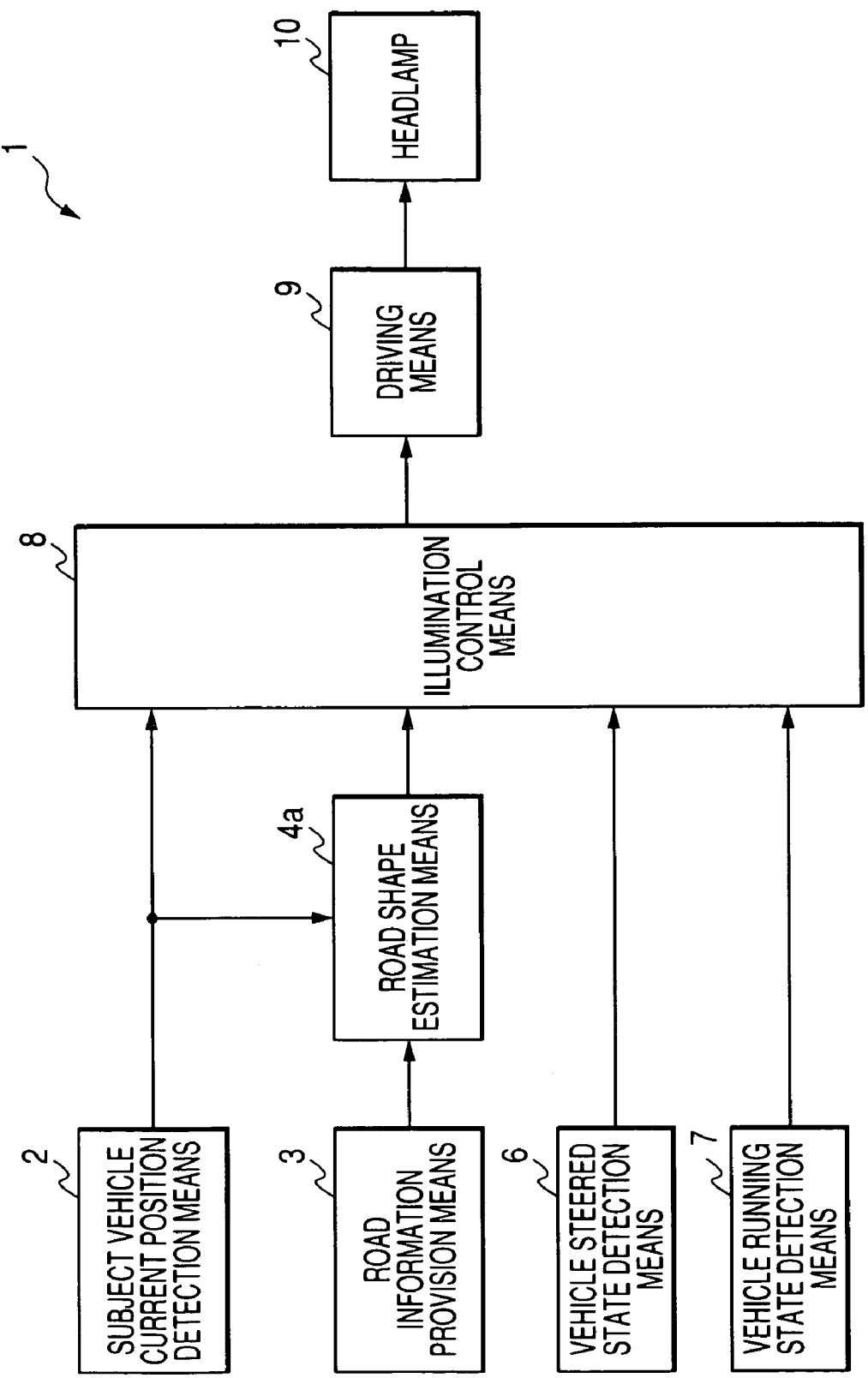
FIG. 14 is a drawing illustrating an example of a basic configuration of the invention.

Next, FIG. 14 is a drawing illustrating a basic configuration according to the second embodiment of the invention.

A vehicle lighting system 1 has the following constituent components (numerals within parentheses denote reference numerals) in order to realize an illumination control which follows the control modes that have been described above.

Cruising vehicle current position detecting device (2)
Road information providing device (3)
Road shape estimating device (4a)
Vehicle steering state detecting device (6)
Vehicle driving state detecting device (7)
Illumination control device (8)
Driving device (9)
Vehicle headlamp (10)

The cruising vehicle current position detecting device 2 is provided for obtaining information on the current position of the cruising vehicle. For example, a navigation system making use of GPS (Global Positioning System) employing an artificial satellite communication and a road-to-vehicle communication is raised (the current position of the vehicle on the driving path can be detected using a road map database provided from a recording medium such as a CD-ROM or DVD-ROM and position data, data on the orientation of the cruising vehicle and vehicle speed data which are obtained by making use of the artificial satellite communication and the road-to-vehicle communication). Then, the information on the current position of the cruising vehicle is sent out to the road shape estimating device 4a and the illumination control device 8.

The road information providing device 3 is such as to provide, for example, data for a road map database which is necessary for map matching and path guiding, and output data therefrom are sent to the road shape estimating device 4a for use in estimating the shape of a driving path.

The road shape estimating device 4a is such as to estimate the shape of a driving path path to thereby estimate the existence of a curved path, a bent path and an intersection ahead of the cruising vehicle and the results of such an estimation are sent to the illumination control device 8. Namely, information on the driving path can be obtained using the road map data, data on the positions of a plurality of nodes (road representing points) situated ahead of and behind the current position of the cruising vehicle can be read using data on the current position of the vehicle from the cruising vehicle current position detecting device 2, and data of a road shape (a path shape) which is made as a model can be generated by connecting the plurality of nodes related to the cruising vehicle driving path through an interpolation processing (3-point arc interpolation process, bisecting osculating circle process and Newton's 4-point forward interpolation process).

The vehicle steering state detecting device 6 detects the steering state of the cruising vehicle or traveling direction (orientation) thereof. For example, the device detects the steering state of the vehicle including a direction in which the vehicle turns using a steering sensor and an angular speed sensor and sends out the detected information to the illumination control device 8. Alternatively, the device sends out to the illumination control device 8 an azimuth angle variation that is detected using an orientation sensor such as a gyro sensor.

The vehicle driving state detecting device 7 detects the vehicle speed or acceleration of the cruising vehicle and sends out the results of the detection to the illumination control device 8. For example, when the vehicle enters a shape change point on a curved or bent path and an intersection, the current vehicle speed data are necessary to calculate a driving time required for the vehicle to reach the shape change point or the like.

The illumination control device 8 processes information from the cruising vehicle current position detecting device 2, the road shape estimating device 4a, the vehicle steering state detecting device 6 and the vehicle driving state detecting device 7 and outputs an illumination control output according to the driving conditions for the illumination control of the vehicle headlamp 10.

For example, letting a driving distance or driving time that the cruising vehicle has to cover or take before it reaches a shape change point or an intersection which is estimated, using the current position of the cruising vehicle as a reference, to exist ahead of the cruising vehicle in the traveling direction thereof be denoted as "X", the illumination control device 8 calculates the "X" based on the information on the current position of the cruising vehicle, the results of the estimation of the road shape, the vehicle speed data and data on the driving distance that has to be covered by the cruising vehicle. Then, the "X" so calculated is compared with a primary reference value (hereinafter, referred to as "REF1") and a secondary reference value (hereinafter, referred to as "REF2") which are both predetermined. Note that the value of REF1 preferably takes a driving distance (this distance corresponds to a gazing point position) of on the order of 1.5 to 3.5 seconds as, for example, a driving distance within a predetermined time at the current vehicle speed of the vehicle. In addition, the value of REF2 is made to be smaller than the value of REF1 and is regulated according to map-matching accuracies (the REF2 value can be made to be smaller as the map-matching accuracy increases).

In the determination of the "X" using REF1 and REF2, in the event of "X≦REF1", the primary control mode is selected, and in the event of "X≦REF2", the secondary control mode is selected. Namely, the different control modes are changed over according to conditions in which the cruising vehicle approaches the curved or bent path.

In the primary control mode, it is estimated that a curved path, a bent path or an intersection exists within the predetermined range in the traveling direction of the cruising vehicle, the illumination control of the headlamps is performed while estimating the shape of the road on the periphery of the current position of the cruising vehicle. For example, a driving distance and a direction that the cruising vehicle has to cover and take before it reaches the shape change point or the intersection from the current position thereof are calculated, so that the illuminating direction of the vehicle headlamp is changed according to the distance and direction so calculated, or the illuminating range thereof is changed (expansion of the range or the like).

Letting an illumination angle (or expansion quantity of the illuminating range) of the vehicle headlamp which takes the traveling direction of the cruising vehicle as a reference be denoted as "θ", there is raised a type in which when the vehicle enters a curved path or the like, the illumination control is performed by setting the value of θ to, for example, "θ=arctan (0.5·(W/D))", where "arctan ( )" represents an inverse tangent function, "W" denotes the width of the lane, and "D" denotes a distance that is covered by the cruising vehicle when it runs a time predetermined with respect to the current vehicle speed of the cruising vehicle or a legal speed limit regulated for the road on which the cruising vehicle is driving (for example, on the order of 1.5 to 3.5 seconds).

In the event that the existence of an intersection on the traveling path of the vehicle is estimated, when the driving distance or driving time that the vehicle has to cover or take before it reaches the intersection becomes equal to or smaller than REF1 and the driver turns on a direction indicator lamp, it is preferable to perform an illumination control in such a manner as to provide an illumination angle of a predetermined quantity in a direction which follows the indication by the driver or to expand the illuminating range by a predetermined quantity so as to include the indicated direction. Alternatively, in the event that the traveling path of the vehicle is set in advance through a route guidance, it is preferable to perform the illumination control of the headlamp in such a manner as to provide an illumination angle of a predetermined quantity in a direction which follows the set indication or to expand the illuminating range of the headlamp by a predetermined quantity so as to include the indicated direction.

In addition, in the secondary control mode, in consideration of a change not only in the traveling direction but also in the steering state of the vehicle through driving operations, the illumination control of the vehicle headlamp is performed based not only on the results of the estimation of the road shape on the periphery of the current position of the cruising vehicle but also on detected information on the steering state of the cruising vehicle.

For example, the following processes will be performed.

(1) Obtain a control quantity (a primary control quantity) with respect to the illuminating direction or illuminating range of the vehicle headlamp based on the detected information on the steering state of the cruising vehicle.

(2) Obtain a control quantity (a secondary control quantity) with respect to the illuminating direction or illuminating range of the vehicle headlamp based on the results of the estimation of the shape of the driving path in the traveling direction of the cruising vehicle.

(3) Compare the primary control quantity with the secondary control quantity.

(4) Select the larger one of the primary and secondary control quantities to perform an illumination control in accordance with the control quantity so selected.

The sequence with respect to (1) and (2) may be reversed.

In the secondary control mode, to avoid adverse effects attributed to control accuracy and the like, the process described under (4) above is adopted. Namely, since it is difficult to perform a proper illumination control when on driving on a curved or slaloming path by depending only on the estimation of the road path shape of the driving path, in the event that the secondary control quantity according to the shape of the curved path is insufficient, the primary control quantity that is calculated based on the information on the steering state is adopted so as to regulate the illuminating direction (in this case, "the primary control quantity>the secondary control quantity).

The driving device 8 includes driving mechanisms or actuators, a control circuit and all the other components which are needed to change the postures or positions of reflectors, optical elements such as lenses, light blocking members and a light source. In addition, while a headlamp or a fog lamp is taken as an example of the vehicle headlamp 9, a type of configuration in which a lamp is used which enables the light distribution control alone or a type of configuration in which a plurality of lamps are combined may be taken for the example of the headlamp 9.

In the application of the invention, for example, a type of configuration is taken in which ECU's (electronic control units) are linked with an in-vehicle LAN (Local Area Network), which will be described below.

- A type of configuration in which cruising vehicle current position information and road information are sent to a navigation ECU to perform the road shape estimation process therein, and, in addition, information detected on the vehicle steering state and information detected on the vehicle driving state are sent to an illumination control ECU for process, whereby the illumination control ECU, which receives the results of the processing by the navigation ECU via the LAN, controls the illumination of the headlamp.
- A type of configuration in which the navigation ECU takes on part or most of the processes allocated to the illumination control ECU (the necessity of the illumination control ECU is obviated or a minimum level of processing necessary for illumination control is carried out by the illumination control ECU).
- A type of configuration in which the navigation ECU simply outputs map data, current position data and the like, whereas the illumination control ECU performs all the processings including the road shape estimation process.

In addition, as to mechanisms which are necessary for the illumination control of the headlamps, for example, in the event of a type of configuration in which the illuminating direction of part of a beam is changed to a desired direction, there is raised a type in which part of optical components such as reflectors and lenses are driven by actuators (for example, a movable reflector which can be driven by a motor is added to a stationary reflector). In addition, in a type of configuration in which the illuminating direction of the whole beam is changed to a desired direction, there are raised a type in which a driving mechanism is provided for moving the whole of the lamp optical system and a type in which a driving mechanism is provided for moving the whole of the lenses or reflectors which constitute an optical system (since there are known various types which enable the light distribution control and the invention can be applied to any type of configuration, a detailed description of a specific configuration of a lamp will be omitted here.

Figure 15:
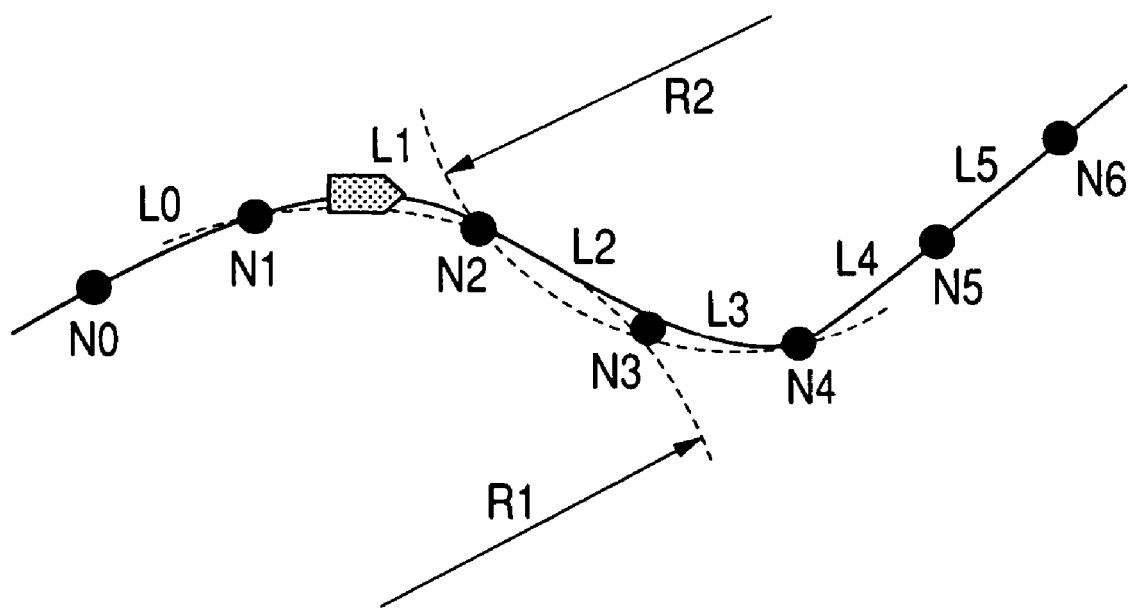
FIG. 15 is an explanatory drawing explaining a driving example on a curved path.

Next, FIG. 15 illustrates a driving example, in which nodes N0, N1 to N4 and links L0, L1 to L3 are shown.

In a type in which the segment distinguishing type as already described under (III) with referring to the Table 1 is adopted for the determination of a curved path segment, in this example, L1 is regarded as a current position link and the current position of the vehicle represented by a home plate-like symbol is regarded as a reference, and a radius of curvature (or curving radius) "R1" is obtained by applying the 3-point arc interpolation to two nodes N2 and N3 which are situated ahead of the symbol and one node N1 which is situated rearwards thereof. Then, the 3-point arc interpolation is applied to nodes N3, N4 and N2 while regarding a next link L2 as a reference so as to obtain a radius of curvature "R2".

Signs of the radius values (R1 and R2) are defined in such a manner as to become opposite according to directions in which the curved path curves. For example, a radius value of a rightward curve is made to take a positive value, whereas a radius value of a leftward curve is made to take a negative value (or they may be reversed).

In a case where curved segments continue as in an S-shaped curve, the sings of radius values change at a point in time when the vehicle has passed through a certain point (in this example, the node N2). For example, according to the definition above, R1 takes a positive value, whereas R2 takes a negative value, and when L2 becomes the current position link, the signs of the radius values change.

Namely, a radius of curvature of a curved segment through which the cruising vehicle is about to pass can be obtained by applying the 3-point arc interpolation to nodes at three points which constitute two adjacent links of links that are formed by connecting a plurality of nodes within a predetermined range including the current position of the cruising vehicle, to be specific, nodes which are adjacent to each other.

As an interpolation process that is used in the road shape estimating device 4a, in addition to the 3-point arc interpolation process, for example, a bisecting osculating circle interpolation process and Newton's 4-point forward interpolation process are raised, and a smoothing process, which is already described above, is used for a segment to which the use of any of the processes is inappropriate.

In addition, in a case where the Newton's 4-point forward interpolation process is used, letting each position coordinates of nodes at four points be denoted by "(xi, yi)" (i=0, 1, 2, 3), the following cubic equation "y(x)" is obtained.

$$y(x) = y_0 + x \cdot \Delta y_0 + x \cdot (x-1)/2! \cdot \Delta^2 y_0 + x \cdot (x-1) \cdot$$
$$(x-2)/3! \Delta^3 y_0$$
$$= y_0 + x \cdot (y_1 - y_0) + x \cdot (x-1) \cdot$$
$$(y_2 - 2 \cdot y_1 + y_0)/2 + x \cdot (x-1) \cdot$$
$$(x-2) \cdot (y_3) - 3 \cdot y_2 + 3 \cdot y_1 - y_0)/6$$

[Equation 1]

Note that "$\Delta y_0$" is a primary difference, $\Delta^2 y_0$ is a secondary difference and $\Delta^3 y_0$ is a tertiary difference, and they are defined by the following definitions.

$$\Delta^n y(x) = \Delta(\Delta^{n-1} y(x))(\Delta^0 y(x) = y(x), n=1, 2, 3, \ldots)$$
$$\Delta y0 = y1 - y0$$
$$\Delta^2 y0 = y_2 - 2 \cdot y_1 + y_0$$
$$\Delta^3 y = y_3 - 3 \cdot y_2 + 3 \cdot y_1 - y_0$$

It is preferable to redefine in detail the shape of the driving path in the segment to which the smoothing process was applied by generating new nodes as shown by Na, Nb in FIG. 9.

As to a relationship between the definition of the shapes of driving paths and the interpolation processes, let the current position link L1 and the forward link L2 be illustrated by combinations of curved segment, inflected segment and rectilinear segment, and the results will be as what is shown in a table below.

TABLE 3

| L2 | Curved Segment | Inflected Segment | Rectilinear Segment |
|---|---|---|---|
| curved segment | L1, L2: 3-point arc interpolation | L1, L2: 4-point Newton interpolation | L2: linear interpolation; Other than L2: 3-point arc interpolation or 4-point Newton interpolation |
| inflected segment | Li, L2: 4-point Newton interpolation | L1, L2: 4-point Newton's interpolation | L2: linear interpolation; Other than L2: 3-point arc interpolation or 4-point Newton's interpolation |
| rectilinear segment | L1: linear interpolation; L2: 3-point arc interpolation | L1, L2: regarding both as curved segments, smoothing | L1, L2: linear interpolation or smoothing, regarding N1 as a bending point |

In the 3-point arc interpolation process, perpendicular bisectors are drawn with respect to adjacent links, respectively, and a point of intersection of the bisectors so drawn is made to be the center of an arc (the center of a curvature).

Note that in the event that the 3-point arc interpolation is used continuously, for example, when an arc of a radius of Ri−1 is obtained from a pair of adjacent links "Li−1, Li" and an arc of a radius of Ri is obtained from a next pair of links "Li, Li+1", there is caused a problem that both the arcs exist in a superimposed fashion over the node Ni to the node Ni+1. Namely, in an inflected segment which changes the signs of radii, in the event that the discontinuity of the driving path shape becomes remarkable, the bisecting osculating circle interpolation process is used.

In the event that both L1, L2 are curved segments, the 3-point arc interpolation process and bisecting osculating circle interpolation process are preferred, and in the event that L1 is an inflected segment, while L2 is a curved segment, although it is preferable to apply the 4-point forward interpolation to, for example, L0, L1, L2, a method can be adopted in which in the segments other than L1, L1 is regarded as a rectilinear segment, and the 3-point arc interpolation is preferably implemented in the other segments.

In the event that L1 is regarded as a rectilinear segment and L2 as a curved segment, for example, L0, L1 are rectilinear segments (consequently, the linear interpolation), and N2 can be defined as a curved path starting point.

In the event that L1 is a curved segment and L2 is an inflected segment, for example, the 4-point forward interpolation is preferred in which the current position link constitutes a center link. In addition, in the event that both L1 and L2 are inflected segments, while, for example, the 4-point forward interpolation is preferred in which the current position link constitutes a center link, the smoothing process may be implemented by defining the links to form a curved path in which N2 constitutes a bending point.

In the event that L1 is a rectilinear segment and L2 is an inflected segment, in a curved segment including L1, L2, for example, N2 is regarded as a curved path starting point, and L2, L3 may be defined as curved segments.

In the event that L1 is a curved segment and L2 is a rectilinear segment (with a long link length), the 3-point arc interpolation or the 4-point forward interpolation is desirably applied to segments other than L2. In addition, the driving path may be defined with N2 regarded as a curved path terminating point and N3 as a curved path starting point.

In the event that L1 is an inflected segment and L2 is a rectilinear segment (with a long link length), the 3-point arc interpolation or the 4-point forward interpolation is desirable in segments other than L2. In addition, as to L1, L2, they may be defined to form a curved segment with N2 being a center of the segment.

In the event that L1 is a rectilinear segment and L2 is a rectilinear segment (with a long link length), for example, in a curved segment with N2 being a bending point, the smoothing process may be implemented with a linear radius for road design.

In the examples described above, it is possible to define shapes of road paths which are classified into nine types; 3×3=9, and while the appropriate interpolation processes may be used according to the link characteristics and the results of distinguishing between the driving segments, since it is difficult to deal with all road shapes that exist in reality, it is preferable to use, as appropriate, the smoothing process using the radius of curvatures created for designing road paths like those described above.

In addition, the road shape estimating device 4 is preferably made to calculate, for example, the following information based on the results of the generation of data with regard to road shapes.
  radius of curvature (a curving radius) and curved path starting and terminating points of a curved path estimated to exist ahead of the cruising vehicle
  A bending point direction angle formed as viewed from the driver's seat when driving on a curved path estimated to exist ahead of the cruising vehicle (the angle of a clipping point, that is, an angle formed between an axis extending in the traveling direction of the vehicle and a line connecting a point of contact between the line of sight and the road path and the vehicle)
  A bending angle (refer to "α" in FIG. 4) on a bending path and the like The accuracy of the current position of the cruising vehicle becomes critical in the shape estimating process with respect to road paths, and a process for correcting the current position of the vehicle is performed in accordance with, for example, the following procedure.

(1) Calculate an estimated range of orientation change within a target link (a link which is assumed as a current position link) based on a shape equation for a road path that is estimated from road shape data generated by distinguishing between segments and implementing the interpolation processes that have been described above.

(2) In the event that data detected on the orientation of the cruising vehicle are out of the estimated range calculated under (1) above, it is determined that the current position of the cruising vehicle does not exist on the link used under (1), and continue the correction process of the current position of the cruising vehicle.

(3) In the event that data detected on the orientation of the cruising vehicle fall within the estimated range calculated under (1) above, a position whose orientation is regarded as the same as or closest to the orientation detection data on the link used under (1) is estimated as the current position of the cruising vehicle and perform a position correction.

(4) Return to (1) for repetition of the processes.

Figure 16:
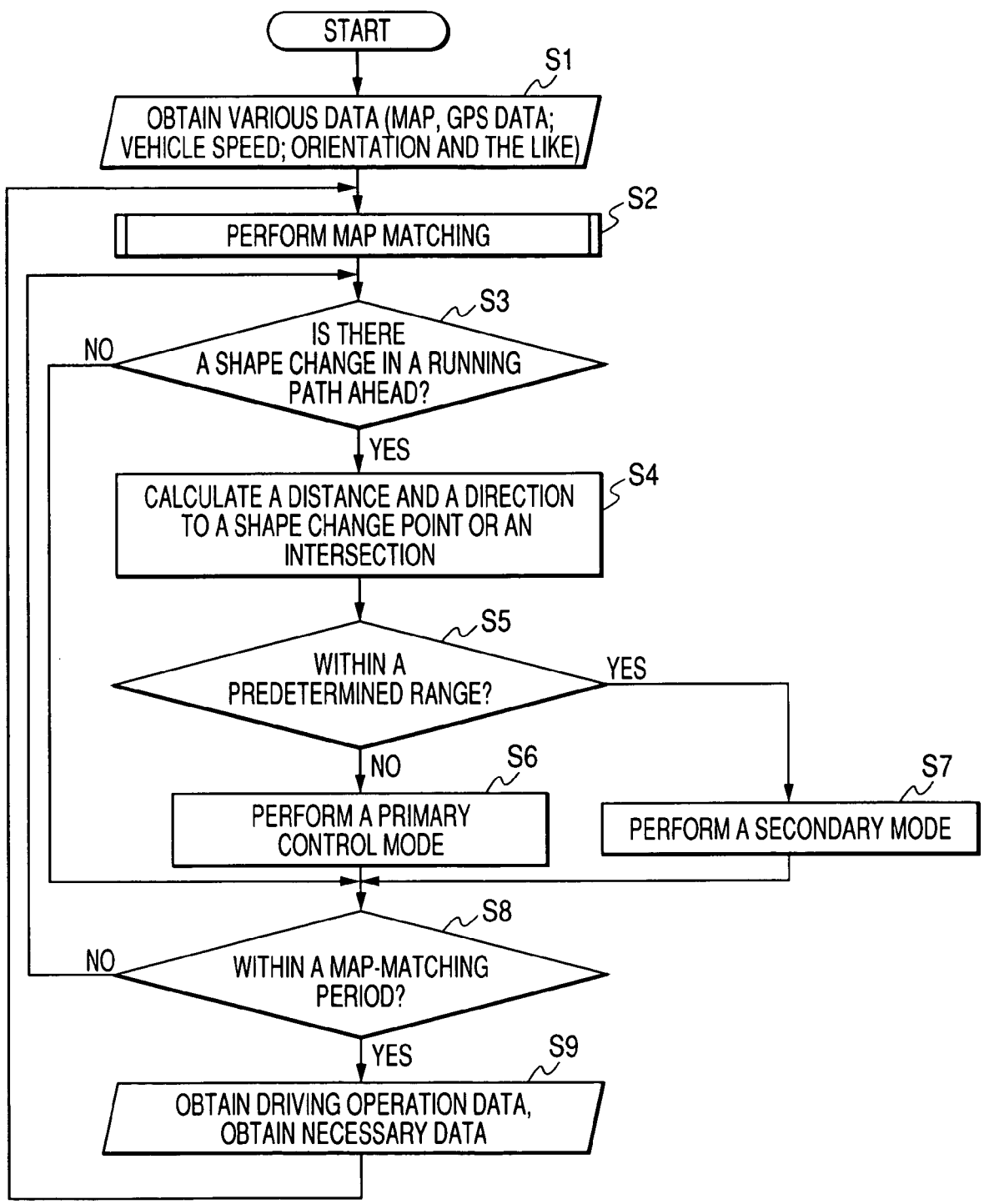
FIG. 16 is a flowchart illustrating an example of an illumination control.

FIG. 16 is a flowchart illustrating an example of an illumination control process of the invention.

Firstly, in step S1, the following necessary information is read into the system.
  Road map data for use in the navigation system
  GPS data
  Vehicle speed data
  Orientation data (information detected by a rate gyro or the like)
  Data detected on steering angle or the like and driving operation data Note that the road map data are obtained as required, but the other data are obtained at a predetermined sampling period.

In a next step S2, a map matching is executed in accordance with a predetermined procedure so as to determine a road on which the cruising vehicle is driving and to calculate the current position of the cruising vehicle on the driving path. Note that in the event that there exists only a single road, two adjacent nodes are obtained based on GPS coordinates, and a location which constitutes a shortest point on a link between the two nodes from the GPS coordinates is made to be the current position of the cruising vehicle after the map matching. In addition, in the event that there exist roads (for example, in the event that there exist a plurality of roads near the vehicle as at a hairpin bend or as in an urban area), the current position of the cruising vehicle is tentatively determined on a most reliable link based on the GPS coordinates and orientation data. Note that the estimation accuracy of the current position can further be enhanced using a method for normally or periodically comparing a driving locus that is obtained from the GPS data or vehicle speed and the orientation data with the road shape on the road map.

In step S3, whether or not the existence of a curved path, an inflected path or an intersection is estimated within a range of a predetermined distance or a predetermined driving time from the current position of the cruising vehicle is determined. Then, if it is estimated that a curved path, an inflected path or an intersection exists, proceed to a next step S4. On the contrary, if it is estimated that none of them exists, proceed to step 8.

In step S4, a distance and a direction to a shape change point (including a bending point) of a curved path, an inflected path and the like or an intersection is calculated with the current position of the cruising vehicle regarded as a reference, and proceed to a next step S5.

In step S5, the "X" (the distance to the shape change point of the road path or the intersection) is compared with the REF1, REF2. Then, in the event of "REF2≦X≦REF1", proceed to step S6, but in the event of "X≦REF2", proceed to step S7.

In step S6, an illumination control is performed in accordance with the primary control mode (for example, the illuminating direction is changed by a control quantity corresponding to the θ.)

In addition, in step S7, an illumination control is performed in accordance with the secondary control mode.

In the event of "X>REF1", it indicates a long driving distance to be covered by the vehicle before it reaches the shape change point or the intersection on the driving path ahead of the vehicle, and various illumination control methods can be applied. For example, there are raised a type in which a vehicle position of the cruising vehicle (a position that will be reached by the cruising vehicle) after a predetermined period of time has elapsed is estimated, so that the direction of an illumination beam is controlled using the position so estimated as a gazing point and a type in which the direction of an illumination beam is controlled using a clipping point of a single curved path as a gazing point. Note that the clipping point is defined as a point of contact which results when a tangential line is drawn from the cruising vehicle position relative to a line defining the shoulder of the road or a center line thereof which is obtained from a shape line defining the shape of the driving path path (a point of intersection between the line defining the shoulder of the road or the center line thereof and the tangential line so drawn), and the angle at the clipping point means an angle formed between an axis extending in the traveling direction of the vehicle and a tangential line drawn from the line defining the shoulder of the road or the center line thereof and can be obtained using the road shape data (the path shape data) via a known method (an osculating circle method). In addition, in the event of a rectilinear path, a method can be adopted in which no special illumination control is performed (the illuminating direction and illuminating range are in the reference states thereof).

In step S8, which follows steps S6 and S7, whether or not the time that has elapsed until the current point in time is out of a map-matching period (that is, the map-matching process is performed at a constant period). If the elapsed time falls within the map-matching period, then, the flow returns to step S3, but if the time is out of the map-matching period, proceed to a next step S9, where driving operation data including a steering angle are read, and GPS data, vehicle speed data, orientation data and the like are read as required, the flow then returning to step S2.

In a configuration using an ECU (electronic control unit) incorporating a computer, for example, the aforesaid processes are realized as internal processing within the ECU using hardware such as CPU (central processing unit), memory, and input and output ports, as well as programs that are executed by the CPU.

Thus, according to the configuration that have been described heretofore, the shape change point including the bending point, the intersection and the like on the driving path can be estimated from the current position of the cruising vehicle and the road shape which are obtained from the navigation system and the like, and the illumination control, which additionally incorporates therein the steering state of the vehicle can be performed on the driving path segment such as the curved path, the bent path and the like. As a result, even in the event that the map-matching accuracy is insufficient, the illumination control can be realized which does not make the driver feel a feeling of physical disorder or uncomfortableness.

Figure 17:
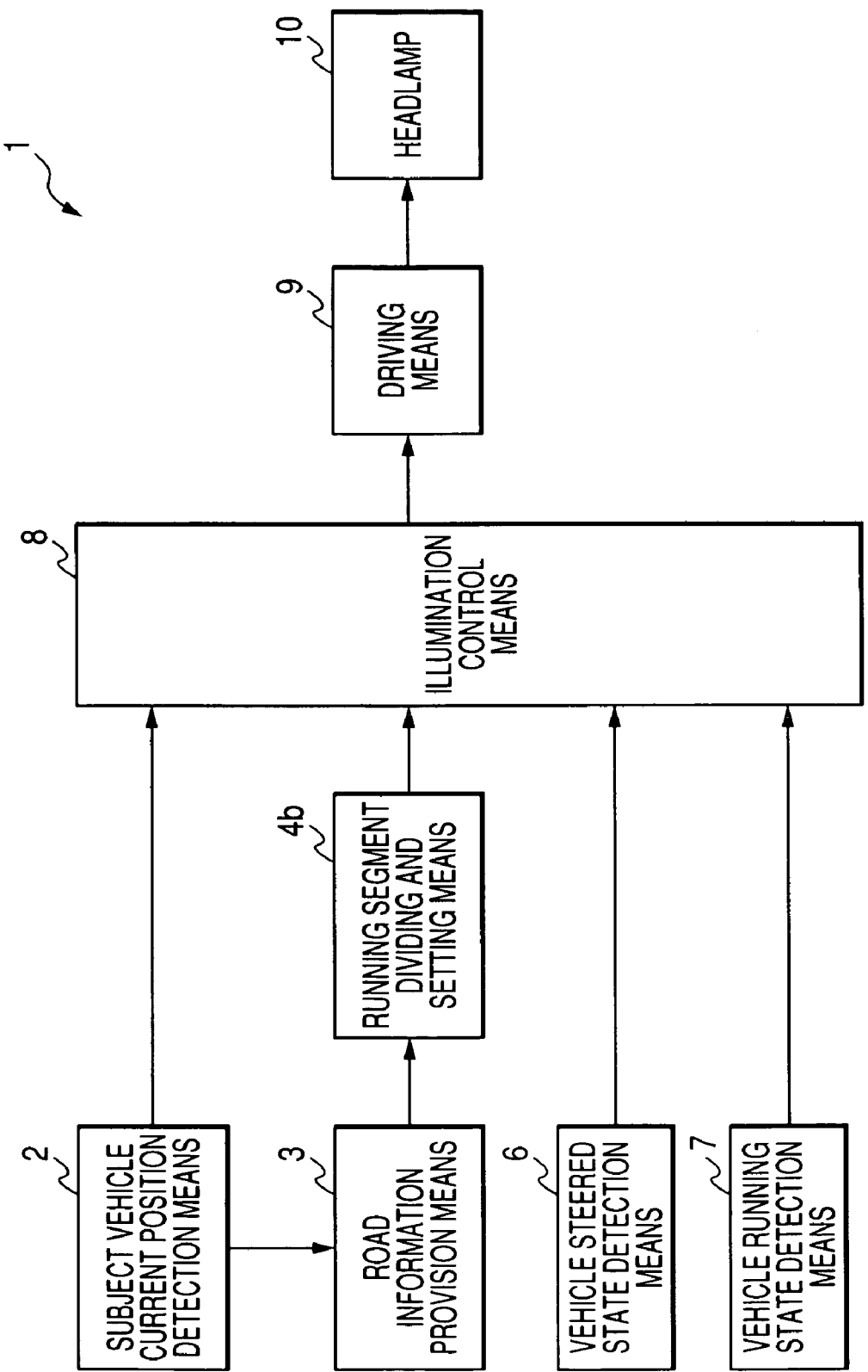
FIG. 17 is a diagram showing an example of a basic configuration of the invention.

Next, FIG. 17 shows other example of a basic configuration according to the third embodiment of the invention.

A vehicle lighting system 1 is such as to implement the illumination control of vehicle headlamps while obtaining data on the current position of a vehicle and estimating the shape of the road on the periphery of the current position of the cruising vehicle using road map data and includes the following constituent elements (numerals within parentheses denote reference numerals)

A cruising vehicle current position detecting device (2)
A driving path shape change detecting device (3)
A driving path segment dividing and setting device (4b)
A vehicle steering state detecting device (5)
A vehicle driving state detecting device (6)
An illumination control device (7)
A driving device (8)
Vehicle headlamp (9)

The cruising vehicle current position detecting device 2 is provided for obtaining information on the current position of the cruising vehicle. For example, a navigation system making use of GPS (Global Positioning System) employing an artificial satellite communication and a road-to-vehicle communication is used (the current position of the vehicle on the driving path can be detected using a road map database provided from a recording medium such as a CD-ROM or DVD-ROM and position data, data on the orientation of the cruising vehicle and vehicle speed data which are obtained by making use of the artificial satellite communication and the road-to-vehicle communication). Then, the current position information is sent out to the driving path shape change detecting device 3 and the illumination control device 7.

The driving path shape change detecting device 3 is such as to detect the existence of a curved path, a bent path or an intersection which is emerging ahead of the cruising vehicle. The driving path shape change detecting device 3 can read position data of a plurality of nodes situated ahead of and behind the current position of the cruising vehicle using the data on the current position of the cruising vehicle and the road map database so as to estimate the shape of a driving path ahead thereof by connecting the plurality of nodes via an interpolation process. In addition, since the information on the driving path can be obtained using the road map database from a road information providing device, not shown, data of a road shape (a path shape) which is made as a model can be generated by obtaining data on the positions of the plurality of nodes situated ahead of and behind the current position of the cruising vehicle using the data on the current position of the vehicle from the cruising vehicle current position detecting device 2 and connecting the plurality of nodes related to the cruising vehicle driving path through the interpolation processing (the 3-point arc interpolation process, bisecting osculating circle process and Newton's 4-point forward interpolation process).

In the event that the existence of a curved path or the like on the driving path in the traveling direction of the cruising vehicle is detected by the driving path shape change detecting device 3 (a specific method will be described in detail later on), a notice thereof is sent to the driving path segment dividing and setting device 4b, which is disposed downstream of the driving path shape change detecting device 3. The driving path segment dividing and setting device 4b specifies a driving path segment extending from an entry point where the cruising vehicle enters an estimated curved path or the like to an exit point where the cruising vehicle exits therefrom and divides the driving path segment into a plurality of segments. Namely, the driving path segment which extends from the entry point where the cruising vehicle enters the curved path or the like to the exit point where the cruising vehicle exits therefrom is divided and set into the plurality of segments and informs the illumination control device 7 of information including a piece of information regarding the position of the driving path segment on which the cruising vehicle is driving.

The vehicle steering state detecting device 5 detects the steering state of the cruising vehicle or traveling direction (orientation) thereof. For example, the device detects the steering state of the vehicle including a direction in which the vehicle turns using a steering sensor and an angular speed sensor and sends out the detected information to the illumination control device 7. Alternatively, the device sends out to the illumination control device 7 an azimuth angle variation that is detected using an orientation sensor such as a gyro sensor.

The vehicle driving state detecting device 6 detects the vehicle speed or acceleration of the cruising vehicle and sends out the results of the detection to the illumination control device 7. For example, the current vehicle speed data are necessary to calculate a driving time required for the vehicle to reach a curved path, a bent path or an intersection.

The illumination control device 7 modifies the contents of the illumination control of the head lamp system for each segment based on the results of a determination on to which of the divided segments the current position of the cruising vehicle belongs. Namely, when the cruising vehicle runs through the plurality of divided segments, illumination control outputs according to the segments are sent out to the driving device 8 so as to change the illuminating direction, illuminating range or illuminating light quantity of the vehicle headlamp 9 (to reduce the quantity of light, turn off the headlight or dimmer the same when entering, for example, an intersection).

The driving device 8 includes driving mechanisms or actuators for changing the postures or positions of reflectors, optical elements such as lenses, light blocking members and a light source or a control circuit for implementing the adjustment of the output or point switching off of the light source. In addition, while a headlamp or a fog lamp is taken as an example of the vehicle headlamp 9, a type of configuration in which a lamp is used which enables the light distribution control alone or a type of configuration in which a plurality of lamps are combined may be taken for the example of the headlamp 9.

In the application of the invention, for example, a type of configuration is taken in which ECU's (electronic control units) are linked with an in-vehicle LAN (Local Area Network), which will be described below.

A type of configuration in which cruising vehicle current position information and road information are sent to a navigation ECU to perform the road shape change detection process and road segment division and setting process therein, and, in addition, information detected on the vehicle steering state and information detected on the vehicle driving state are sent to an illumination control ECU for process, whereby the illumination control ECU, which receives the results of the processing by the navigation ECU via the LAN, controls the illumination of the headlamp.

A type of configuration in which the navigation ECU takes on part or most of the processes allocated to the illumination control ECU (the necessity of the illumination control ECU is obviated or a minimum level of processing necessary for illumination control is carried out by the illumination control ECU).

A type of configuration in which the navigation ECU simply outputs map data, current position data and the like, whereas the illumination control ECU performs all the processing including the road shape change detection process and road segment division and setting process.

Next, while curved paths detected by the driving path shape change detecting device 3 includes a bent path in which two rectilinear segments are connected to each other at a certain angle and an intersection, the curved paths are those which do not include a curved path which curves in a single steering direction or an inflected segment (a range in which the sing of an outer product of adjacent link vectors does not change).

Figure 18:
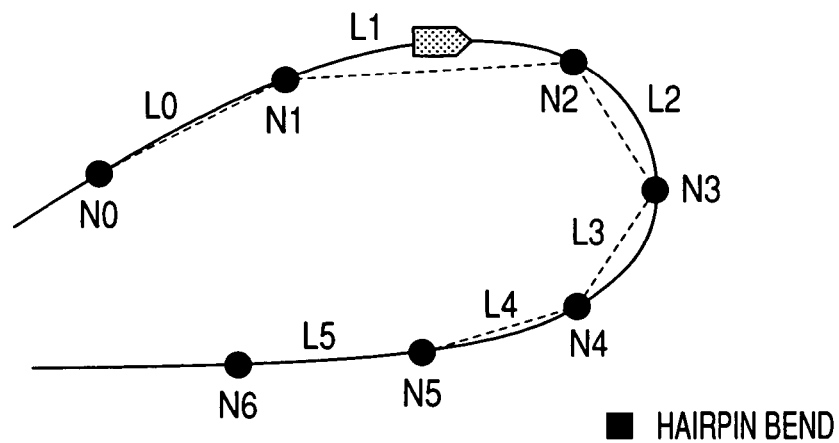
FIG. 18 is a drawing which illustrates, together with FIG. 19, a driving path segment to which the invention can be applied and which explains a hairpin bend segment.
Figure 19:
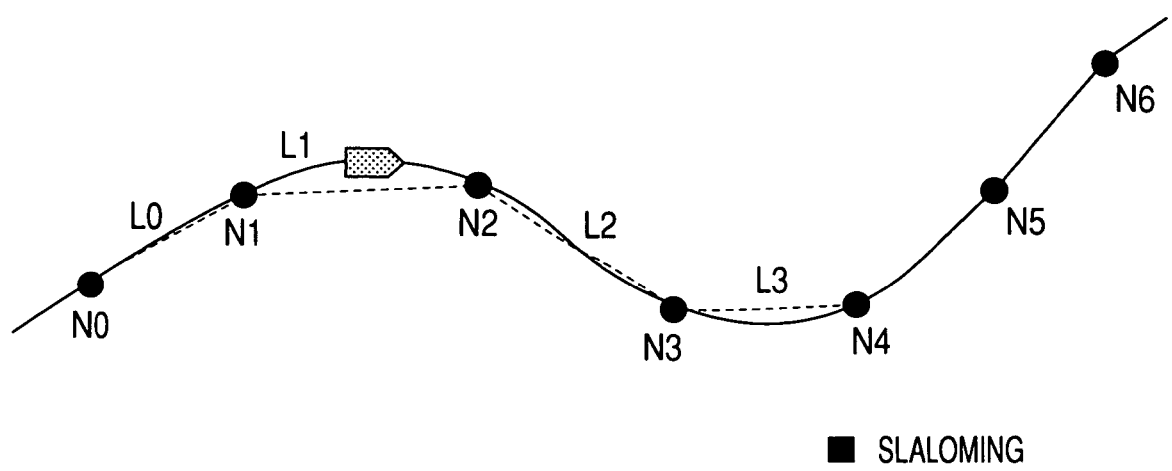
FIG. 19 is an explanatory drawing of a slaloming segment.

FIGS. 18 and 19 illustrate driving path segments to which the invention can be applied.

In a hairpin bend segment shown in FIG. 18, as shown by N1 to N4, the steering wheel is operated to turn to the right in the traveling direction of the vehicle. Namely, since the steering wheel is operated in a single steering direction, a range defined at least from a node N1 to a node N5 constitutes a curved segment.

In addition, in a slaloming segment shown in FIG. 19, L2 is an inflected segment. Namely, in the event that L2, which includes an inflection point, exists, avoiding a definition of a curved path including L2, it is preferable to divide the curved path before or after L2 to make a definition (in this example, the curved path may be divided into a curved path which includes N1, N2, N3 and a curved path which includes N2, N3, N4).

Figure 20:
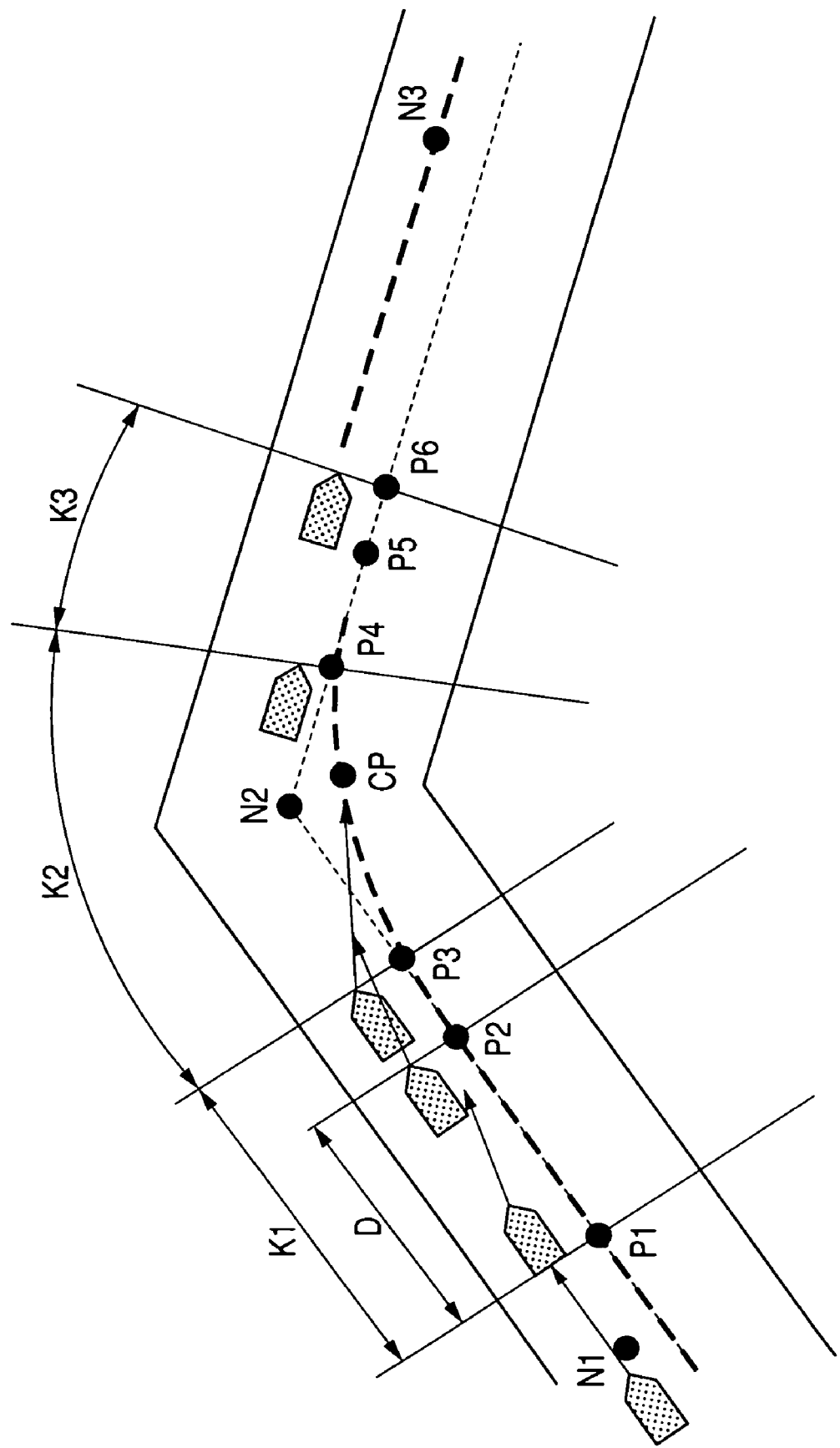
FIG. 20 is an explanatory drawing which illustrates a bent path.

FIG. 20 is a drawing which illustrates a road path shape, driving path segments and the like by taking a bent path as an example, and of nodes N1, N2, N3 in the drawing, N2 indicates a node at a bending point, and "CP" indicates a clipping point. Note that the clipping point is defined as a point of contact which results when a tangential line is drawn from the cruising vehicle position relative to a line defining the shoulder of the road or a center line thereof which is obtained from a shape line defining the shape of the driving path path (a point of intersection between the line defining the shoulder of the road or the center line thereof and the tangential line so drawn), and the angle at the clipping point means an angle formed between an axis extending in the traveling direction of the vehicle and a tangential line drawn from the line defining the shoulder of the road or the center line thereof and can be obtained using the road shape data (the path shape data) via a known method (an osculating circle method).

A target curved path is divided into 3 segments, which will be described below, by the driving path segment dividing and setting device 4b.

Curved path entry segment (refer to "K1")

Steering maintaining segment (refer to "K2")

Curved path exist segment (refer to "K3")

Each of the segments is defined using driving operation determining characteristic points (points detected through driving operation actions or driving operation results), which will be described below.

Curved path entry point (refer to "P1")=a point where the driver starts to notice the existence of a curved path and starts to get himself or herself ready for necessary driving operations.

Steering maintaining starting point (refer to "P3")=a starting point of a steering maintaining segment which is determined using information from the vehicle steering state detecting device 5.

Steering maintaining terminating point (refer to "P4")=a terminating point of a steering maintaining segment which is determined using information from the vehicle steering state detecting device 5.

Curved path exit point (refer to "P6")=a point where the driver terminates the driving operations for the curved path.

Note that "P2" in the drawing indicates a curved path starting point and "P5" indicates a curved path terminating point, the points being determined based on data on the shape of a road path which is estimated ahead of the cruising vehicle.

The P1 corresponds to a point that existed a few seconds before P2 or a steering starting point. In addition, P3 is considered as a point where an output value of the vehicle steering state detecting device 5 exceeds for the first time a detection error range or a preset dead band in the vicinity of P2. P4 is considered as a point where an output of the vehicle steering state detecting device 5 regresses for the first time to the detection error range or the preset dead band before P5. Then, P6 is considered to coincide with P5 or as a point rearwards of P5.

The curved path entry segment K1 is a segment from P1 to P3 (a segment which enters the curved path), the steering maintaining segment K2 is a segment from P3 to P4 (a segment in which the steering state is maintained in a certain direction), and the curved path exit segment K2 is a segment from P4 to P6 (a segment which exits from the curved path).

Note that in this example, the curved path is divided into the three segments K1 to K3 using the driving operation determining characteristic points (4 points), so that different illumination controls are executed for the individual segments.

In addition, while the curved path starting point P2 and the curved path terminating point 5 are determined based on the shape of the road path as has been described above, in the event of a bent path, for example, a smoothing process shown in FIG. 6, which is already described, is preferably used.

It is noted, however, that when the angle of a bent segment is represented using the α, it is desirable that the value of the radius R is set to a value which is slightly larger than the radius of the shape of a designed road path (for example, in the case of a road whose designed road speed is 40 km/hr, R=on the order of 30 m, and a gap distance between the bending point and the arc (R) is set so as not to exceed the width of a lane)

It is preferable to define in detail the shape of the driving path in the segment to which the smoothing process was applied by generating new nodes as shown by Na, Nb. Namely, Na, Nb are defined as points in contact between the arc R and the rectilinear paths L1, L2, and Na corresponds to the curved path starting point P2, Nb corresponding to the curved path terminating point P5.

Note that the driving path shape is expressed by "d=R·(α/2)", when an arc distance between the new node and a vertex of the arc (R) in the vicinity of the bending point is denoted as "d".

In the event that a relationship between the characteristic points and the curved path starting point and the curved path terminating point is defined as has been described above, P3 is located forwards of P2, and P4 is located rearwards of P5.

P1 is optimally located at a position which is apart from P2 towards the cruising vehicle side by a distance that would be covered by the cruising vehicle when it runs 1 to 3 seconds, and P6 may be set in the vicinity of P5.

Next, the details of the illumination control of the headlamp executed by the illumination control device 7 will be described below.

Letting an angle related to the illuminating direction or the angle of the illuminating range of the headlamp that is controlled by the illumination control device 7 be "ψ", for example, the following processes will be performed according to the respective segments.

(A1) Curved Path Entry Segment K1

At a point in time when the cruising vehicle has reached the point P1 on the segment K1, a certain direction angle is set in a direction where the curved path exists (hereinafter, this angle is denoted as "θ"). For example, a specific position is set which will result ahead of the cruising vehicle when it runs a predetermined time (1.5 to 3.5 seconds) or which is a predetermined distance (40 m or the like) ahead of the cruising vehicle, whereby an illumination control is performed so that the θ and the ψ coincide with each other. Thereafter, letting an illumination control angle that is calculated based on steering information estimated using information detected by a yaw rate sensor or an orientation sensor incorporated in the GPS navigation system or steering angle information detected by a steering sensor be denoted as "ω", this ω is compared with the θ, and a larger one of the two angles ω,θ is taken. Namely, the larger one of the two angles ω,θ is made to be a control target value for the ψ, and an illumination control is performed so that both the angles coincide with each other.

(A2) Steering Maintaining Segment K2

In the event that the cruising vehicle exists within the segment K2, the position of a clipping point (CP) that was obtained from data related to the road path shape of the driving path or a position that is expected to be reached by the vehicle after the vehicle has run a predetermined time (for example, 2.5 seconds) is set as the position of a gazing point, and a control angle to the position so set is calculated as a target for the ψ, so that the ψ is controlled towards this target. Alternatively, the ψ may be controlled using the ω.

Note that data related to nodes and links, road information (including data on road width) and information on the current position of the cruising vehicle are considered to be necessary for the calculation of the clipping point, and the following processes are performed as a procedure for the calculation.

(1) Calculation of a driving path shape
(2) Calculation of a road shoulder line
(3) Calculation of a clipping point on each of lanes for the cruising vehicle and oncoming vehicles Firstly, in (1) above, a link is determined which is formed by connecting a plurality of nodes. For example, a driving path shape ahead of the cruising vehicle is obtained by applying an arc interpolation or the like to node positions at three points. Note that the driving path in this case is a single line having no width and corresponds to a center line of the road.

Then, in (2), lines defining the shoulders of the roar or road shoulder lines located on left- and right-hand sides of the driving path are obtained using data on the width of the road. Namely, in a case where the left-hand side traffic is adopted according to the road traffic regulation, in consideration of the width of the road, the line obtained under (1) constitutes a road shoulder line for the lane on which the cruising vehicle runs when the line is shifted to the left side as viewed in the traveling direction of the vehicle, while the line obtained under (1) constitutes a road shoulder line for the lane for oncoming vehicles when the line is shifted to the right side as viewed in the traveling direction of the vehicle. Note that as to the position of the cruising vehicle, it is estimated that the cruising vehicle is driving on its own lane at a position located leftwards from the line obtained under (1) in consideration of the width of the road (for example, at the center of its own lane).

In (3), clipping points are obtained as will be described below.

(3-1) clipping point on the side of the lane for cruising vehicle (the left-hand side of the road).

A tangential line with respect to the road shoulder line on the side of the lane for the cruising vehicle (the left-hand side road shoulder line as viewed in the traveling direction) is obtained using the position of the cruising vehicle as reference, and a point of contact (a point of intersection between the left-hand side road shoulder line and the tangential line) is made to be a clipping point.

(3-2) clipping point on the side of the lane for oncoming vehicles (On the Center Line on the right-hand Side of the road).

A tangential line with respect to the center line calculated under (1) above is obtained using the position of the cruising vehicle as reference, and a point of contact (a point of intersection between the center line and the tangential line) is made to be a clipping point.

(A3) Curved Path Exit Segment K3

In the event that the cruising vehicle exists within the segment K3, the illuminating direction in the vicinity of P5 or at P6 needs to be returned to an orthogonal projecting direction or the illuminating range needs to be restored to the original condition. For example, in the event of the control of the illuminating direction, as the position of the cruising vehicle approaches P5 or P6, the $\psi$ is caused to gradually approximate to a final value ($\psi$=0).

Figure 21:
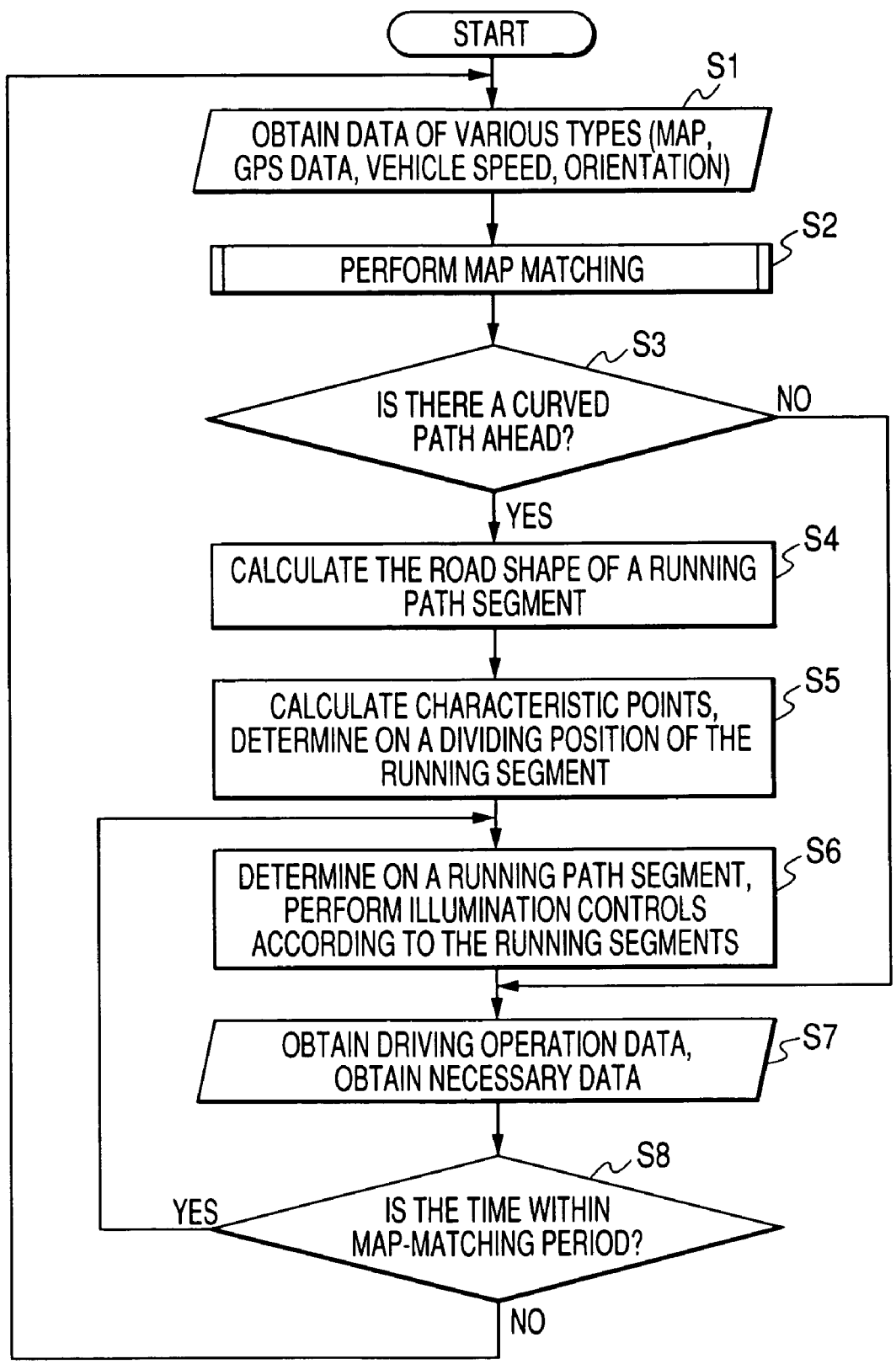
FIG. 21 is a flowchart illustrating an example of an illumination control.

FIG. 21 is a flowchart illustrating a procedure for performing an illumination control using shape data on the shape of a road path that is estimated from node position data.

Firstly, in step S1, the following necessary information is read into the system.

Road map data used in the navigation system
GPS data
Vehicle speed data
Orientation data (information detected by a rate gyro or the like)

In a next step S2, a map matching is executed in accordance with a predetermined procedure so as to determine a road on which the cruising vehicle is driving and to calculate the current position of the cruising vehicle on the driving path. Note that in the event that there exists only a single road, two adjacent nodes are obtained based on GPS coordinates, and a location which constitutes a shortest point on a link between the two nodes from the GPS coordinates is made to be the current position of the cruising vehicle after the map matching. In addition, in the event that there exist roads (for example, in the event that there exist a plurality of roads near the vehicle as at a hairpin bend or as in an urban area), the current position of the cruising vehicle is tentatively determined on a most reliable link based on the GPS coordinates and orientation data. Note that the estimation accuracy of the current position can further be enhanced using a method for normally or periodically comparing a driving locus that is obtained from the GPS data or vehicle speed and the orientation data with the road shape on the road map.

In step S3, whether or not the existence of a curved path, an inflected path or an intersection is estimated within a range of a predetermined distance or a predetermined driving time from the current position of the cruising vehicle is checked. Then, if it is estimated that a curved path, an inflected path or an intersection exists, proceed to a next step S4. On the contrary, if it is estimated that none of them exists, proceed to step S7.

In step S4, the road shape of the driving path segment is determined. Namely, the road path shape of a single curved path is determined, and a curved path starting point P2 and a curved path terminating point P5 are obtained. For example, in the event of a bent path or an intersection, the driving path shape is determined through the aforesaid smoothing process in which the osculating circle R is placed in the vicinity of the node at the bending point.

In a next step S5, driving operation determining characteristic points (P1, P3, P4, P6) are obtained so as to divide the driving path segment into respective segments (K1 to K3).

Then, proceed to step S6 to grasp the segment in which the position of the cruising vehicle exists, and an illumination control is performed according to the segment so grasped.

Figure 22:
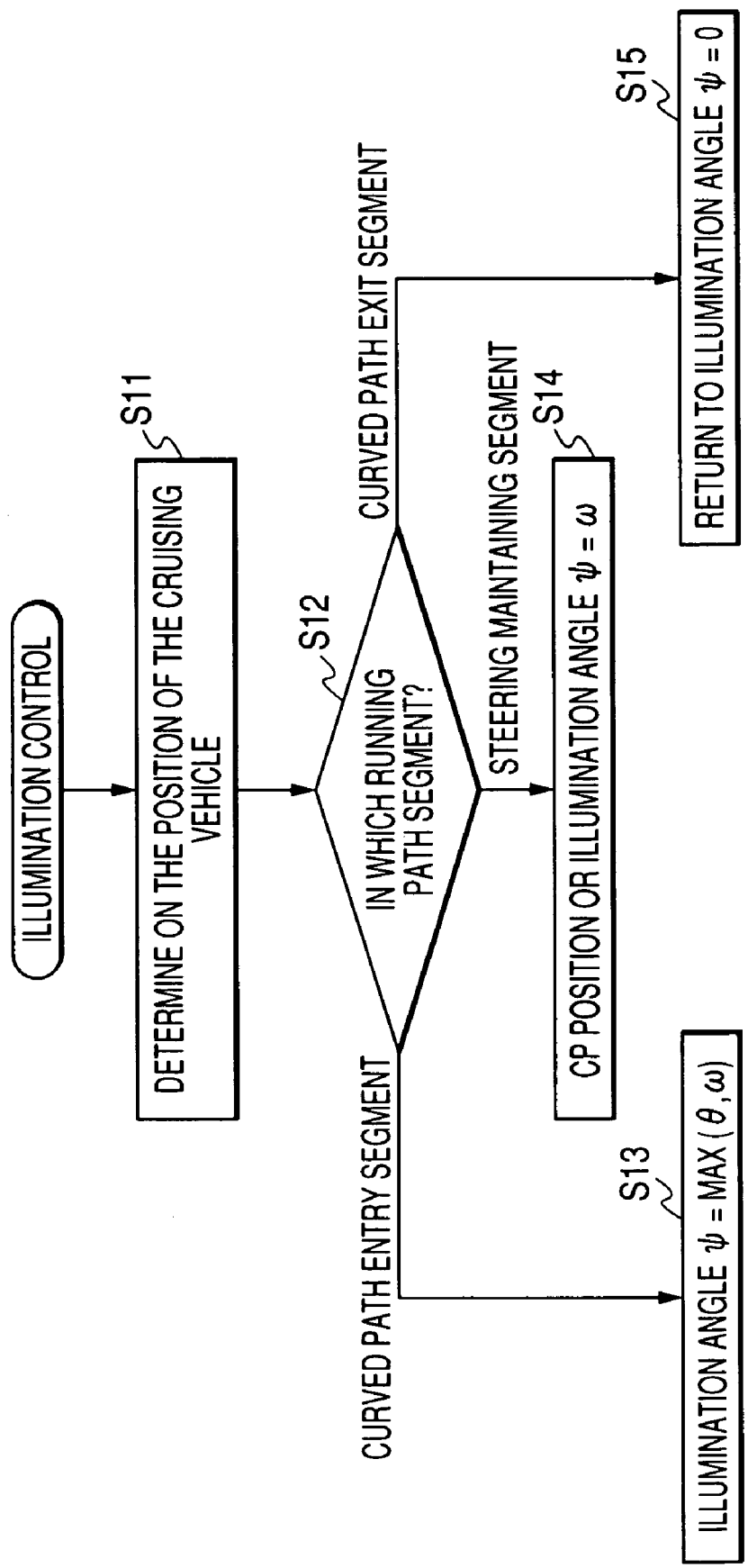
FIG. 22 is a flowchart illustrating an example of an illumination control based on segment determination.
Figure 23:
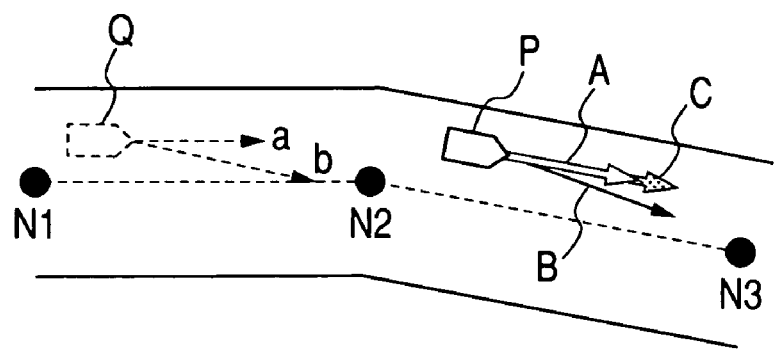
FIG. 23 is a drawing which explains, together with FIGS. 24 and 25, problems and which illustrates a bent path.

FIG. 22 is a flowchart illustrating an example of an illuminating direction control.

Firstly, in step S11, the position of the cruising vehicle is determined. Then, in a next step S12, in which of the curved path entry segment, the steering maintaining segment and the curved path exit segment the current position of the cruising vehicle exists is checked. Then, if the current position of the cruising vehicle exists in the curved path entry segment, proceed to step S13, if the current position of the cruising vehicle exists in the steering maintaining segment, proceed to step S14, and if the current position of the cruising vehicle exists in the curved path exit segment, proceed to step S15.

In step S13, when the vehicle arrives at the curved path entry point P1, the direction angle $\theta$ is set to, for example, "$\theta$=arctan $(0.5\cdot(W/D))$" (where "arctan ( )" represents an inverse tangent function, "W" denotes the width of the lane, and "D" denotes a distance covered by the cruising vehicle when it runs a time predetermined with respect to the current vehicle speed of the cruising vehicle or a legal speed limit regulated for the road on which the cruising vehicle is driving (for example, on the order of 1.5 to 3.5 seconds) to thereby realize illumination angle $\psi$=$\theta$. Then, within the curved path entry segment K1, the value of $\theta$ is compared with the value of $\omega$ which corresponds to the steering state, and the larger value is adopted as $\psi$ ("$\psi$=max $(\theta,\omega)$").

In the steering maintaining segment K2 in step S14, an illumination control is performed such that the position of the clipping point (CP) is made to be an illumination target position or $\psi$=$\omega$.

In the curved path exit segment K3 in step S15, an illumination control is performed such that the illumination angle is returned to the direction which follows the traveling direction of the cruising vehicle so that the illumination angle $\psi$ produces the orthogonal projection ($\psi$=0).

Next, in step S7 in FIG. 21, driving operation data are read. In addition, GPS data, vehicle speed data, orientation data and the like are read as required.

Then, in a next step S8, if the time that has elapsed until the current point in time is out of the map-matching period, the flow returns to step S1, whereas if the time is within the period, then the flow returns to step S6.

In a configuration using, for example, Note that the aforesaid processes are realized as internal processing within an ECU (electronic control unit) incorporating a computer using hardware such as CPU (central processing unit), memory, and input and output ports, as well as programs that are executed by the CPU.

Thus, in the configuration that has been described heretofore, the plurality of nodes situated ahead of and behind the current position of the cruising vehicle are read using the data on the current position of the vehicle and the road map database, and the driving path shape is estimated by connecting the plurality of nodes through the interpolation process. Then, in the event that the curved path exists on the driving path in the traveling direction of the cruising vehicle, and the driving path segment from the entry point of the cruising vehicle into the curved path or the like to the exit point therefrom is divided into the curved path entry segment, the steering maintaining segment and the curved path exit segment, so that the illumination control is performed according to the respective segments so divided. For example, in the curved path entry segment, the illumination angle θ at the curved path entry point is set, and the illumination angle ω is calculated based on the quantity of the steering angle detected by the steering sensor or the orientation variable of the vehicle detected by the orientation sensor. Then, ω is compared with θ, and the illuminating direction is controlled in accordance with the larger value. In addition, in the steering maintaining segment, the clipping point position or the vehicle position which results after the predetermined period of time has elapsed is made to be the target illumination position, or the illuminating direction is controlled in accordance with the ω. Then, in the curved path exit segment, the illuminating direction may be controlled such that the final illumination angle is returned to the orthogonal projection (reference) direction.

The effects on the illumination control attributed to the map-matching accuracy and the like can be relaxed to thereby prevent the occurrence of failures through the controls that have been described above.

Figure 24:
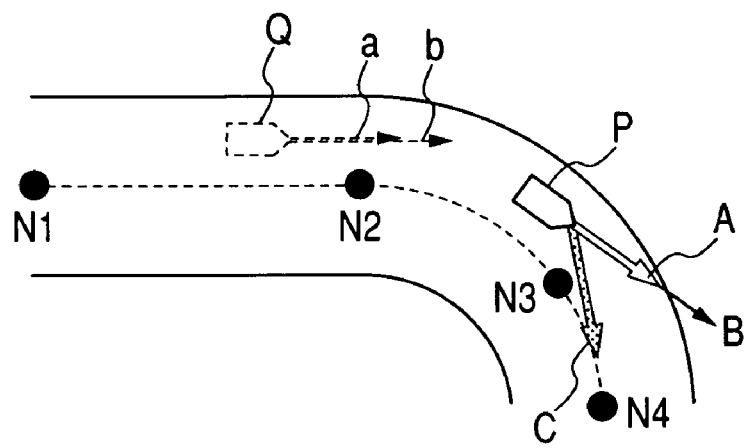
FIG. 24 is a drawing which illustrates a driving on a curved path.
Figure 25:
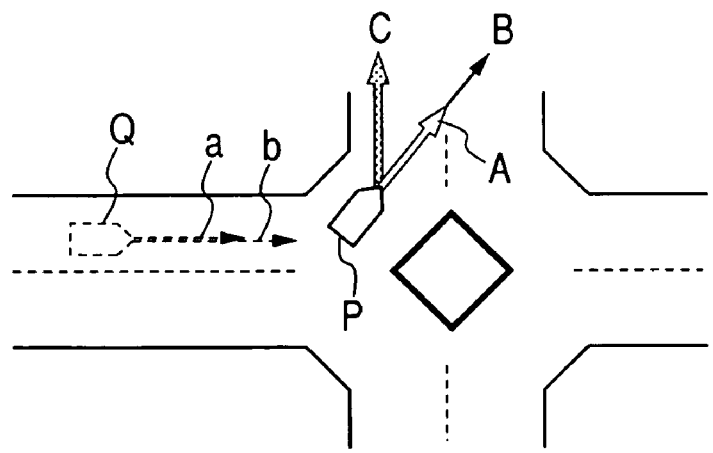
FIG. 25 is a drawing which illustrates a driving in an intersection.
Figure 26:
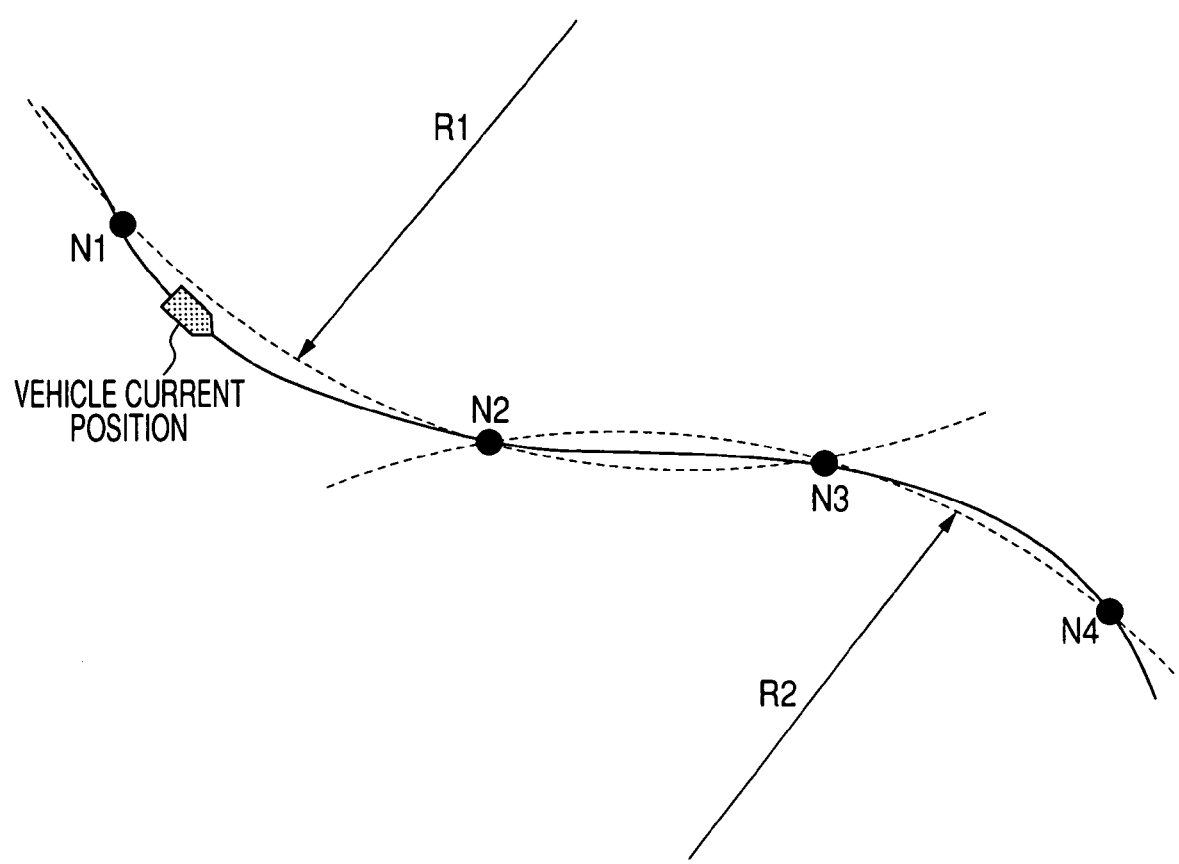
FIG. 26 is a drawing which shows an S-shape curved path as an example of shapes of road paths.

For example, when driving on the curved path shown in FIG. 24, in the event that the actual position P of the vehicle is in the curved path entry segment or the steering maintaining segment, information detected by the steering sensor or the orientation sensor is reflected to the illumination control (for example, since the illumination angle at the position Q on the map or θ is smaller than ω that is determined by the actual steering angle, the illumination angle θ is ignored).

According to the configuration that has been described heretofore, the illumination control in which the actually steering state of the vehicle is added to the results of the estimation of the current position of the cruising vehicle and the driving path shape by the navigation system and the like can be performed on the driving path segment consisting of the curved path or the bent path. As a result, even in the event that the map-matching accuracy is insufficient, the illumination control can be realized which does not make the driver feel a feeling of physical disorder or uncomfortable condition.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lighting system which implements illumination control of vehicle headlamps while obtaining data on the current position of a vehicle and estimating the shape of a road on the periphery of the current position of the cruising vehicle using road map data, comprising:

a node position detecting means to read position data of a plurality of nodes situated ahead of and behind the current position of the cruising vehicle using the data of the current position of the vehicle and the road map data, wherein the plurality of nodes comprise a shape of a road path, and to estimate the shape of a driving path by connecting the plurality of nodes through an interpolation process, and an illumination control means to gradually change a control quantity related to the illumination control of the vehicle headlamps as the cruising vehicle runs through a set range which is regulated ahead of and behind a node recognized as a point of change in the shape of the driving path.

2. A vehicle lighting system as set forth in claim 1 further comprising a transition range setting means, wherein in the event that it is found as a result of estimation of the shape of the driving path that a curved or bent path exists ahead of the cruising vehicle, the transition range setting means is operable to regulate the set range in such a manner as to include a node indicating a starting point or terminating point of the curved path or a node indicating a bending position of the bent path, so that the control quantity is changed gradually from a point in time when the cruising vehicle has entered the set range until a point in time when the cruising vehicle has exited from the set range.

3. A vehicle lighting system as set forth in claim 1 further comprising a road node characteristic point position detecting means, wherein in the event that it is found as a result of estimation of the shape of the driving path that a curved or bent path exists ahead of the cruising vehicle, the road node characteristic point position detecting means is operable to:

specify a node indicating a starting point or terminating point of the curved path or a node indicating a bending position of the bending path and links connecting the node, respectively, to nodes situated ahead of and behind the node in a traveling direction of the cruising vehicle; and set an arc which touches both the links such that a driving path corresponding to the set range is regulated and so that the control quantity is changed gradually according to a change in the shape of the driving path.

4. A vehicle lighting system as set forth in claim 1 further comprising a road node characteristic position detecting means operable to specify, of links that are formed by connecting nodes adjacent to each other, a link nearest to the current position of the cruising vehicle and a next link which is ahead of an adjacent to the link along the traveling direction of the vehicle, and to calculate lengths of the respective links, a distance ratio between both the links and a bending angle between the links for comparison with reference values which are determined in advance, so that the node indicating the starting point or terminating point of the curved path or the node indicating the bending position of the bent path is determined.

5. A vehicle lighting system as set forth in claim 1 further comprising a road node characteristic position detecting means operable to determine the node indicating the starting point or terminating point of the curved path or the node indicating the bending position of the bent path by determining a value of radius of curvature, that is obtained by implementing an arc interpolation on three points which constitute two adjacent links, and a tendency of the value to increase or decrease.

6. A vehicle lighting system comprising an illumination control means having a primary control mode in which the illumination control of a vehicle headlamp is performed while obtaining data on the current position of a vehicle and estimating the shape of a road on the periphery of the current position of the cruising vehicle and a secondary control mode in which the illumination control of the vehicle headlamp is performed based on the results of the estimation of the shape of the road on the periphery of the current position of the cruising vehicle and information detected on a steering state of the cruising vehicle, wherein the illumination control means is operable to calculate a distance or time that the cruising vehicle needs to cover or take from the current position thereof before the cruising vehicle reaches a shape change point of a driving path that is estimated to exist ahead in a traveling direction of the cruising vehicle or an intersection is calculated, so that and to compare the calculated distance or time with predetermined primary and secondary reference values, whereby in the event that the distance or time that the cruising vehicle needs to cover or take is equal to or smaller than the primary reference value, the primary control mode is selected, whereas, in the event that the distance or time is equal to or smaller than the secondary reference value, the secondary control mode is selected.

7. A vehicle lighting system as set forth in claim 6, wherein in the primary control mode, the illumination control means calculates a distance and a direction from the current position of the cruising vehicle to the shape change point of the intersection, so that the illuminating direction or illuminating range of the vehicle headlamp is changed according to the distance and direction so calculated.

8. A vehicle lighting system as set forth in claim 6, wherein in the secondary control mode, the illumination control means calculates a primary control quantity, with respect to the illuminating direction or illuminating range of the vehicle headlamp, based on information on the steering state of the cruising vehicle, and a secondary control quantity, with respect to the illuminating direction or illuminating range of the vehicle headlamp, based on the results of the estimation of the shape of the driving path in the traveling direction of the cruising vehicle, and compares the primary control quantity with the secondary control quantity, wherein the larger one of the primary and secondary control quantities is selected, so that an illumination control is performed in accordance with the control quantity so selected.

9. A vehicle lighting system in which position data of a plurality of nodes, comprising a shape of a road path and situated ahead of and behind the current position of a cruising vehicle, are read using current position data of the vehicle and road map data to estimate the shape of a driving path by connecting the plurality of nodes via an interpolation process, and in the event that a curved path, a bent path or an intersection exists on the driving path in a traveling direction of the cruising vehicle, a driving path segment extending from an entry point where the cruising vehicle enters the curved path, bent path or intersection to an exit point where the cruising vehicle exits therefrom is divided into a plurality of segments for illumination control of a vehicle headlamp according to the respective segments so divided, the vehicle lighting system comprising:

cruising vehicle current position detecting means for detecting a vehicle current position on the driving path by making use of a satellite communication or a road-to-vehicle communication;

vehicle steering state detecting means for detecting a steering angle or a traveling direction of the cruising vehicle;

driving path shape change detecting means for detecting the existence of a curved path, a bent path or an intersection from a shape change in the shape of a road path ahead of the cruising vehicle;

driving path segment dividing and setting means for dividing a driving path segment extending from an entry point where the cruising vehicle enters a curved path, a bent path or an intersection to an exit point where the cruising vehicle exits therefrom into a plurality of segments; and illumination control means for changing the illuminating direction, illuminating range or illuminating light quantity of the vehicle headlamp based on illumination control outputs according to characteristics of the plurality of segments so divided and information detected by the vehicle steering state detecting means, when the cruising vehicle runs on the segments.

10. A vehicle lighting system as set forth in claim 9, wherein the segments divided by the driving path segment dividing and setting means are divided into an entry segment into a curved path, a bent path or an intersection, a steering maintaining segment where a steering state taken towards a certain direction is maintained and an exit segment from the curved path, the bent path or the intersection.

11. A vehicle lighting system as set forth in claim 10, wherein in the entry segment, a control quantity for an illuminating direction or illuminating range set at an entry point into a curved path, a bent path or an intersection is compared with a control quantity for an illuminating direction or illuminating range calculated based on information on the steering state detected by the vehicle steering state detecting means, so that the illuminating direction or illuminating range of the vehicle headlamp is controlled in accordance with a greater one of the two control quantities.

12. A vehicle lighting system as set forth in claim 10, wherein in the steering maintaining segment, the illuminating direction or illuminating range of the vehicle headlamp is controlled in accordance with a control quantity for an illuminating direction or illuminating range calculated based on information on the steering state detected by the vehicle steering state detecting means a control quantity.

* * * * *